US008601676B2

(12) United States Patent
Carpentier et al.

(10) Patent No.: US 8,601,676 B2
(45) Date of Patent: Dec. 10, 2013

(54) INSERTION SYSTEM AND METHOD TO INSERT INSULATORS AND COILS IN THE SLOTS OF THE STATOR OF AN ELECTRIC MACHINE

(75) Inventors: Bruno Carpentier, St-Basile-Le-Grand (CA); Martin Houle, Laval (CA); Stephane Poulin, Sainte-Julie (CA)

(73) Assignee: TM4 Inc., Québec (CA)

( * ) Notice: Subject to any disclaimer, the term of this patent is extended or adjusted under 35 U.S.C. 154(b) by 141 days.

(21) Appl. No.: 13/266,311

(22) PCT Filed: Jun. 28, 2010

(86) PCT No.: PCT/CA2010/001025
§ 371 (c)(1),
(2), (4) Date: Dec. 7, 2011

(87) PCT Pub. No.: WO2011/000103
PCT Pub. Date: Jan. 6, 2011

(65) Prior Publication Data
US 2012/0117790 A1    May 17, 2012

Related U.S. Application Data

(60) Provisional application No. 61/213,640, filed on Jun. 29, 2009.

(51) Int. Cl.
*H02K 3/34* (2006.01)
*H02K 15/06* (2006.01)
*H02K 15/10* (2006.01)

(52) U.S. Cl.
USPC ............................................. 29/734; 29/596

(58) Field of Classification Search
CPC ... H02K 15/10; H02K 15/062; H02K 15/063; H02K 15/065; H02K 15/067
USPC ..................................... 29/596, 598, 606, 734
See application file for complete search history.

(56) References Cited

U.S. PATENT DOCUMENTS

| 1,661,355 | A |   | 3/1928 | Baker |
| 6,154,950 | A | * | 12/2000 | Katahira et al. ................ 29/598 |
| 6,510,603 | B1 |  | 1/2003 | Ebihara et al. |
| 7,185,413 | B2 | * | 3/2007 | Kuroyanagi et al. ........... 29/596 |

* cited by examiner

*Primary Examiner* — Livius R Cazan
(74) *Attorney, Agent, or Firm* — Fay Kaplun & Marcin, LLP

(57) ABSTRACT

The insertion of electrically insulating paper from a continuous roll into slots of a stator created by outwardly projecting teeth is described herein. The insertion of the insulating paper is done by the insertion of prewound coils in the stator slots. The electrically insulating paper is not cut prior to its insertion in the slots, thereby completely covering the outer surface of the stator. The insertion systems and methods described herein are also optionally concerned with the insertion of interphase insulation paper between the different coils inserted in the stator slots and with the insertion of slot closing wedges.

15 Claims, 25 Drawing Sheets

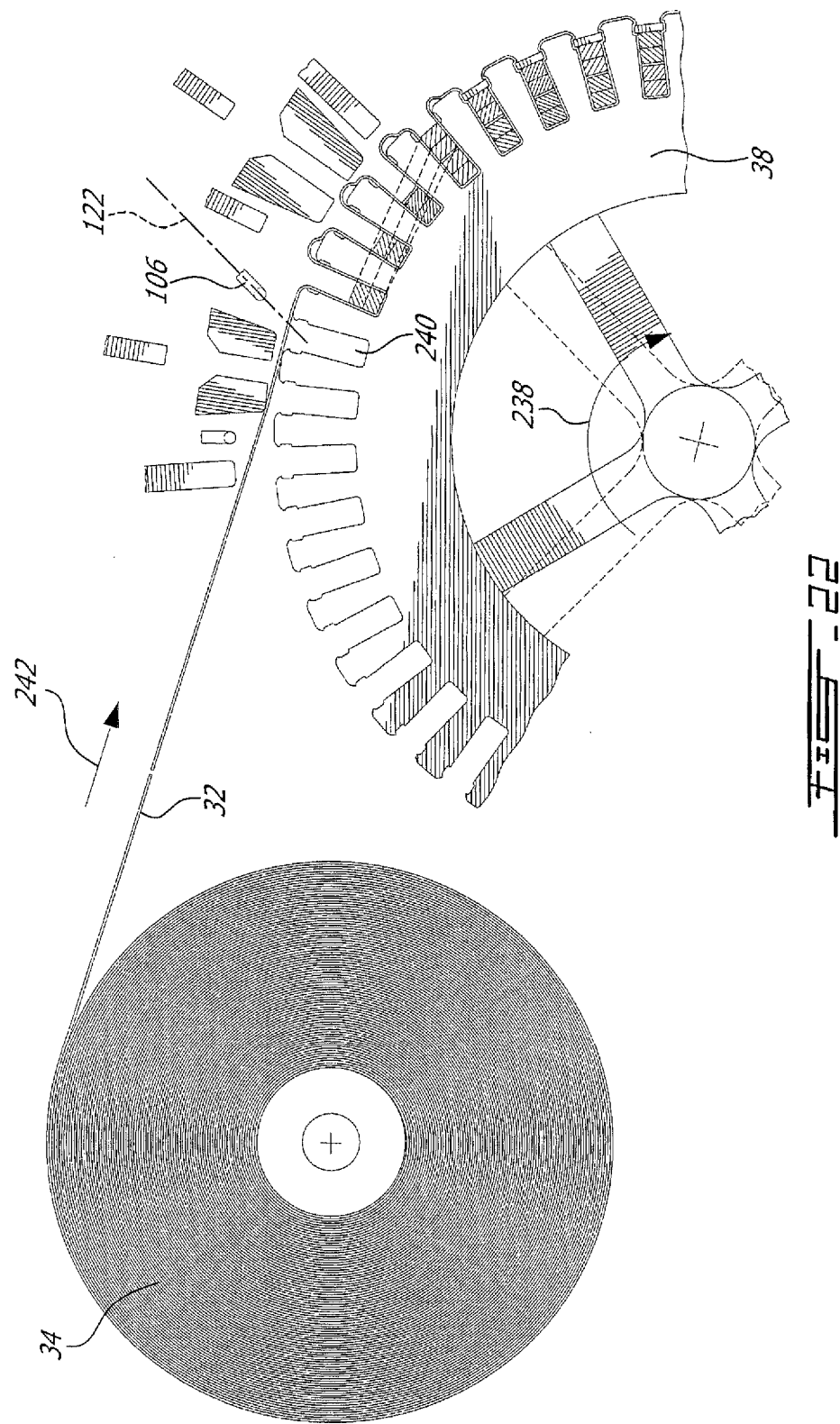

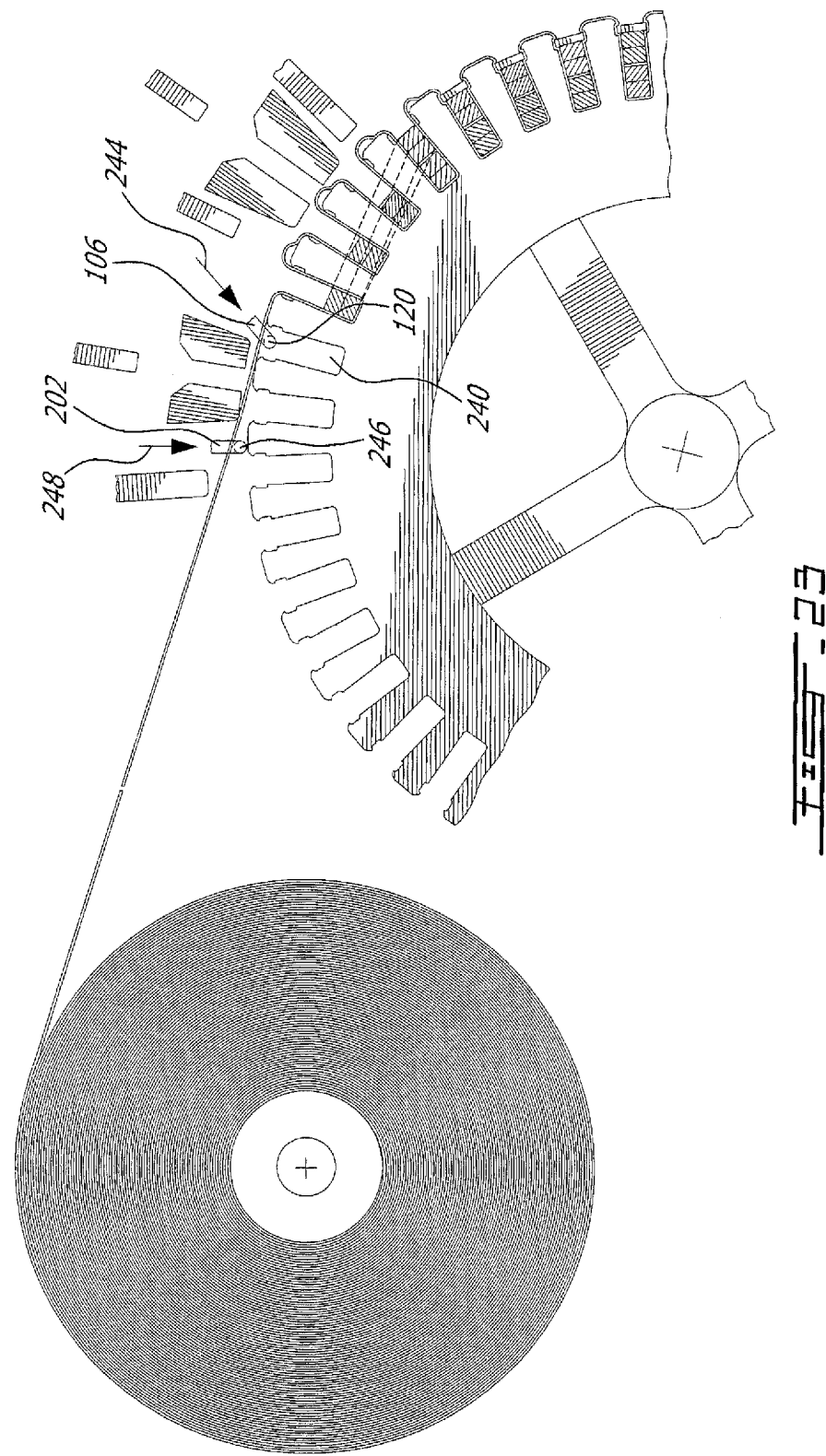

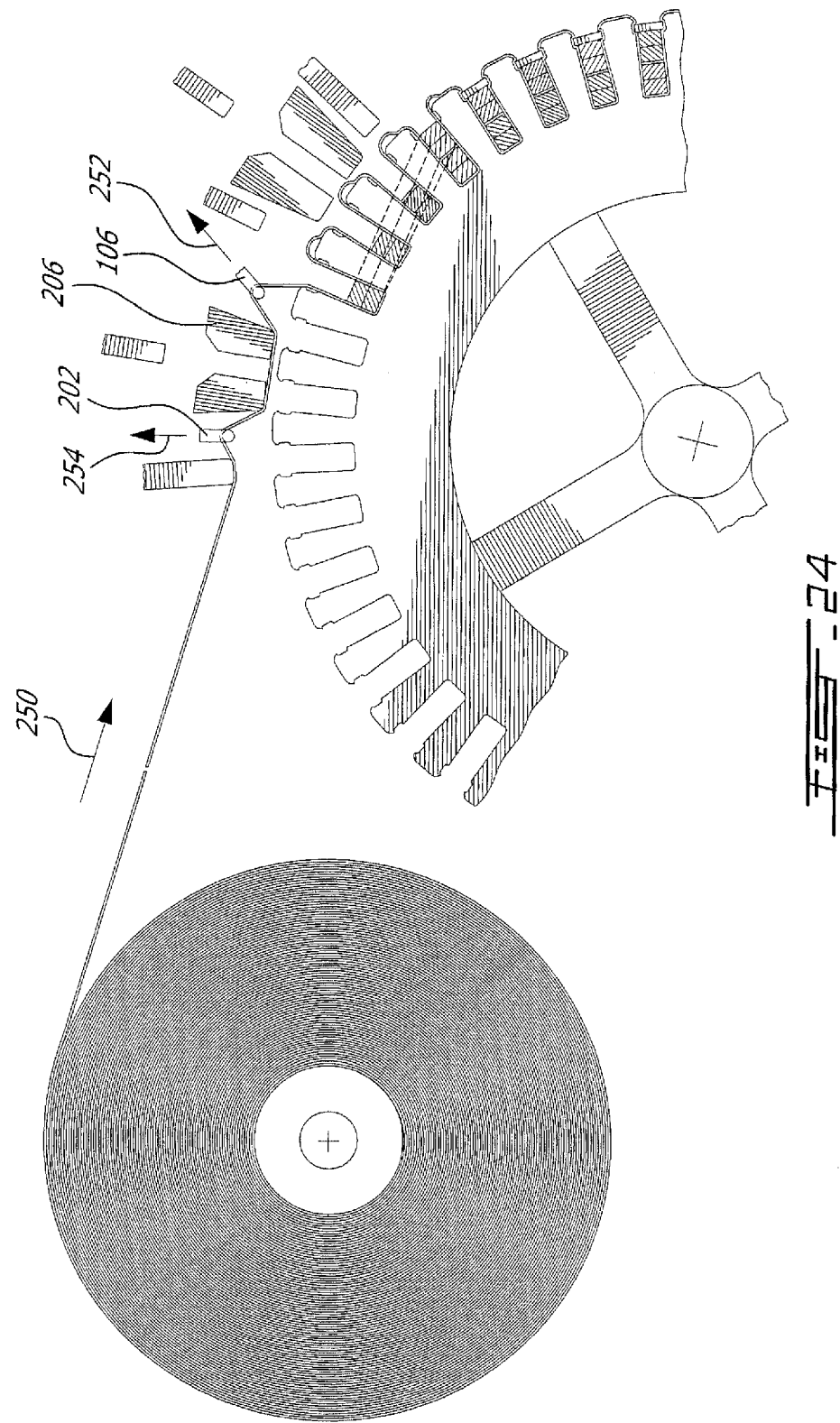

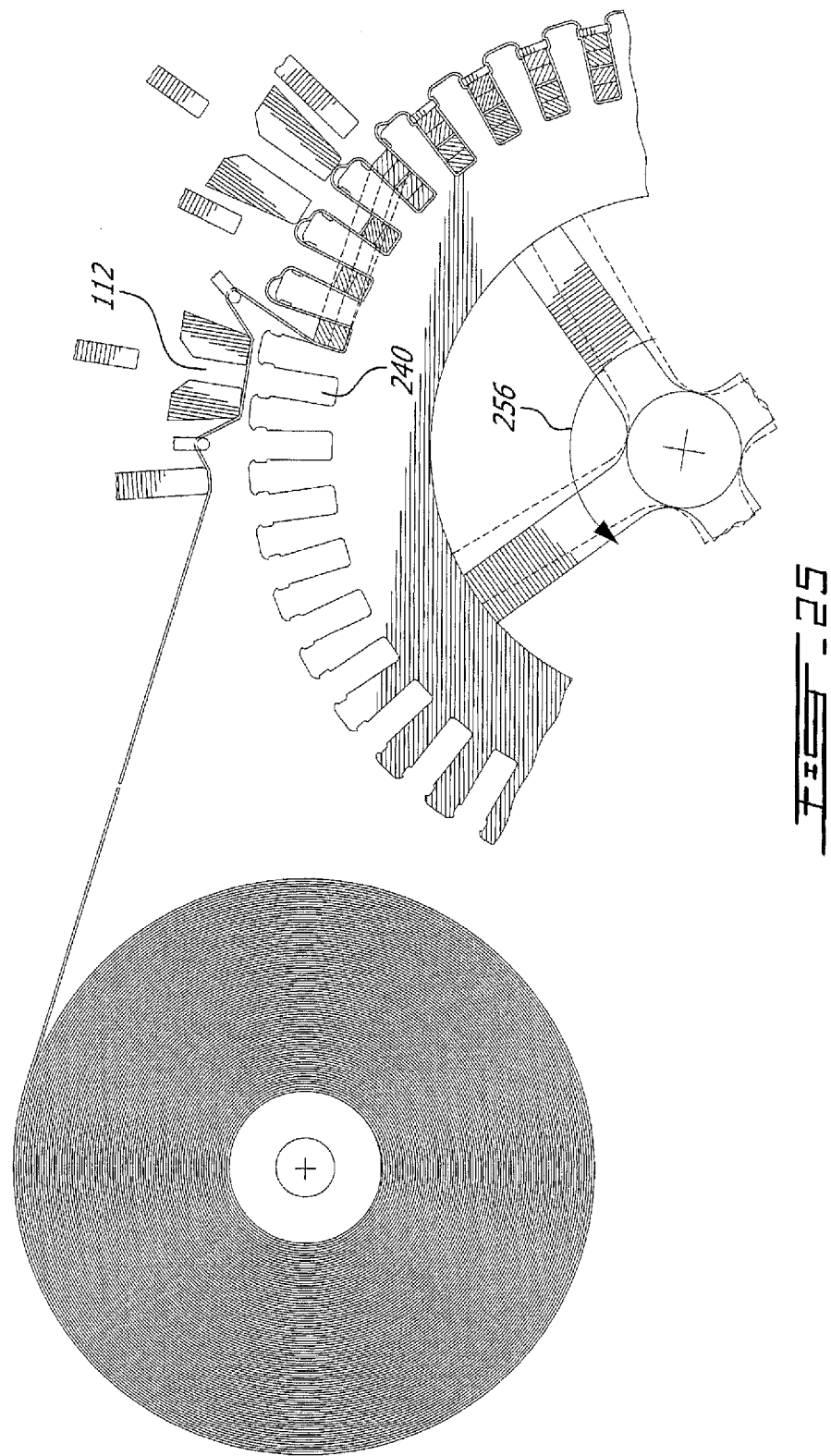

INSERTION SYSTEM AND METHOD TO INSERT INSULATORS AND COILS IN THE SLOTS OF THE STATOR OF AN ELECTRIC MACHINE

FIELD

The present invention relates to electric motors. More specifically, the present invention is concerned with a system and a method to insert insulators and prewound coils in the slots of a stator of an electric machine.

BACKGROUND

Stators of electric machines are routinely made of a stack of laminations provided with coil receiving slots defined by projecting teeth therebetween. These slots generally need to be insulated from the coils that are to be placed therein. Insulating paper material has been developed for this purpose.

Conventionally, rolls of such insulating paper are cut and folded to form individual slot liners that are manually or automatically inserted into the slots. These liners are often U shaped with arms that are sized to extend out of the slot and thus help guide the coil therein while preventing the contact between the coil and the stack of laminations. Once the coils are inserted, the excess material of the slot liners is removed or folded on top of the coil and a slot closing member, generally referred to as a "wedge", is inserted in the slot.

Many drawbacks are associated with this method of forming and installing slot liners. Indeed, manipulating many slot liners is cumbersome. Furthermore, the removal or folding of the excess material is an additional step that increases the manufacturing costs. Thirdly, since the teeth of the laminations are not fully covered by the slot liner, accidental contact between the laminations and the coil may occur and damage the electric machine.

BRIEF DESCRIPTION OF THE DRAWINGS

In the appended drawings:

FIG. 22 is a schematic side elevational view similar to FIG. 17 illustrating the rotation of the stator of a predetermined angle;

FIG. 23 is a schematic side elevational view similar to FIG. 17 illustrating the hooking of the insulation paper by the two paper management hooks;

FIG. 24 is a schematic side elevational view similar to FIG. 17 illustrating the pulling of a quantity of paper from the roll by the two paper management hooks; and FIG. 25 is a schematic side elevational view similar to FIG. 17 illustrating the reverse rotation of the stator of a predetermined angle.

DETAILED DESCRIPTION

Figure 1:
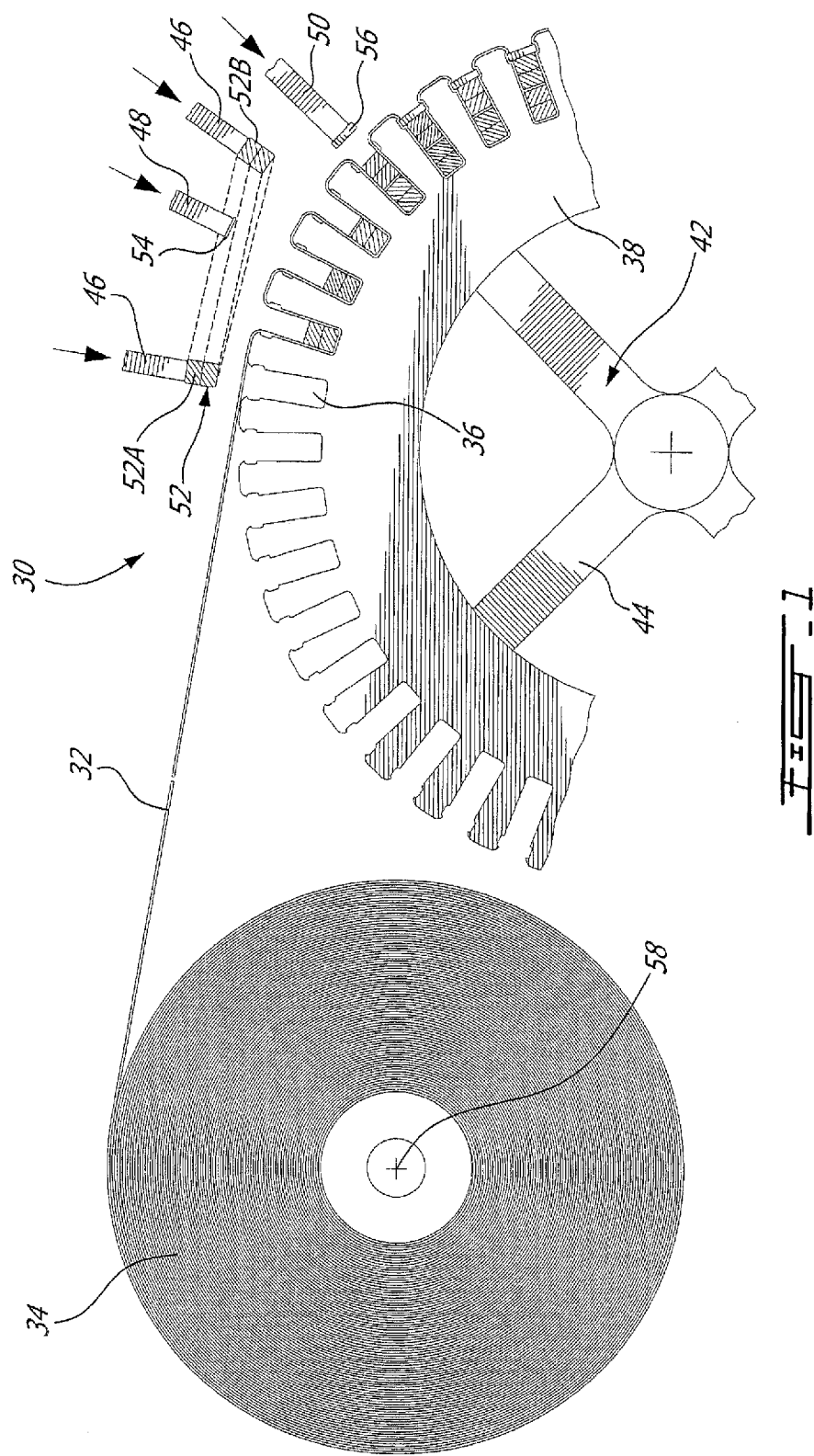
FIG. 1 is a schematic side elevational view of a portion of a stator mounted to an insertion system according to a first illustrative embodiment.

In accordance with an illustrative embodiment, there is provided a system to insert continuous insulating paper and a prewound coil provided with two longitudinal legs in the longitudinal slots of a stator of an electric machine; the insertion system including:

a stator holder so configured as to hold the stator;

a prewound coil holder configured and sized to hold the two longitudinal legs of a prewound coil; the prewound coil holder being radially movable between a retracted position and an extended position where each longitudinal leg enters a corresponding longitudinal slot; the continuous insulating paper extending between the prewound coil holder and the stator;

wherein movement of the prewound coil holder towards the extended position inserts both a portion of the continuous insulating paper and the longitudinal legs of the prewound coil in slots of the stator.

According to another aspect, there is provided a method to insert continuous insulating paper and a prewound coil provided with two longitudinal legs in the longitudinal slots of a stator of an electric machine; the method including:

holding the stator;

providing a prewound coil holder configured and sized to hold the two longitudinal legs of a prewound coil; the prewound coil holder being radially movable between a retracted position and an extended position where each longitudinal leg enters a corresponding longitudinal slot;

positioning the prewound coil holder so that each longitudinal leg faces a corresponding longitudinal slot;

positioning the continuous insulating paper between the forming and inserting assembly and the stator;

moving the prewound coil holder from the retracted position towards the extended position to therefore insert a both portion of the continuous insulating paper and the longitudinal legs of the prewound coil in longitudinal slots of the stator.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is to be noted that the expression "prewound coil" is to be construed herein and in the appended claims as any coil of wire that is prewound before its insertion into the slot of a stator of an electric machine and that is rigid enough to carry out the continuous paper insertion.

Other objects, advantages and features of the present invention will become more apparent upon reading of the following non-restrictive description of illustrative embodiments thereof, given by way of example only with reference to the accompanying drawings.

Generally stated, illustrative embodiments described herein are concerned with the insertion of electrically insulating paper from a continuous roll into slots of a stator created by outwardly projecting teeth. The insertion of the insulating paper is done by the insertion of prewound coils in the stator slots. The electrically insulating paper is not cut prior to its insertion in the slots, thereby completely covering the outer surface of the stator. The insertion systems and methods described herein are also optionally concerned with the insertion of interphase insulation paper between the different coils inserted in the stator slots and with the insertion of slot closing wedges.

Turning now to FIGS. 1 to 5 of the appended drawings, a schematic insertion system 30 according to a first illustrative embodiment will be described.

The insertion system 30 is designed for inserting continuous insulating paper 32 from a continuous roll 34 of paper in the longitudinal slots 36 of a stator 38.

The insertion system 30 includes a rotating stator holder 42 schematically illustrated with four spokes 44, and two interconnected radially movable prewound coil holding and pushing elements referred to as a prewound coil holder 46. The illustrative insertion system 30 optionally includes a radially movable interphase insulation paper holding element 48 and a radially movable wedge holding element 50.

Indeed, as will easily be understood by one skilled in the art, while the insertion illustrating systems and methods discussed herein are also designed to insert the interphase insulation paper and the wedge, this is optional and could be omitted.

The rotating stator holder 42 may be manually rotated as required if the system 30 is a manual system.

Alternatively, the rotation of the rotating stator holder 42 could be controlled by a controller (not shown) should the system 30 be computer controlled. For example, an electric motor such as a stepper motor (not shown) could be used to rotate the rotating stator holder 42 when required.

Similarly, the radial movements of the prewound coil holders 46, of the interphase insulation paper holder 48 and of the wedge holder 50 could be manually done or could be powered by pneumatic or hydraulic cylinders, for example. Other mechanical methods of radially moving the holding elements 46, 48 and 50 under the control of a controller (not shown) could also be used.

The holding elements 46, 48 and 50 use vacuum suction to adequately hold the longitudinal legs 52A and 52B of a prewound coil 52, the interphase insulation paper 54 and the wedge 56, respectively. The vacuum supply may, for example be under the control of a controller (not shown).

The roll of continuous paper 34 is freewheeling on the paper roll holder 58. If required, the holder 58 could also be mechanically powered to controllably feed paper 32. Alternatively, a controlled tension could be applied to the paper roll holder 58 to prevent unwanted unrolling of the continuous paper 32.

The operation of the insertion system 30 will now be described with respect to FIGS. 1 to 5.

FIG. 1 illustrates the stator 38 mounted to the holder 42 and having some of its slots totally or partially filled with insulating paper, prewound coils and wedges. The stator 38 is adequately positioned to receive the continuous insulating paper 32 in its slot 36 since the slot 36 is aligned with the first leg 52A of the prewound coil 52. The coil 52 is mounted to the prewound coil holder 46, the interphase insulation paper 54 is mounted to the holder 48 and the wedge 56 is mounted to the holder 50.

Figure 2:
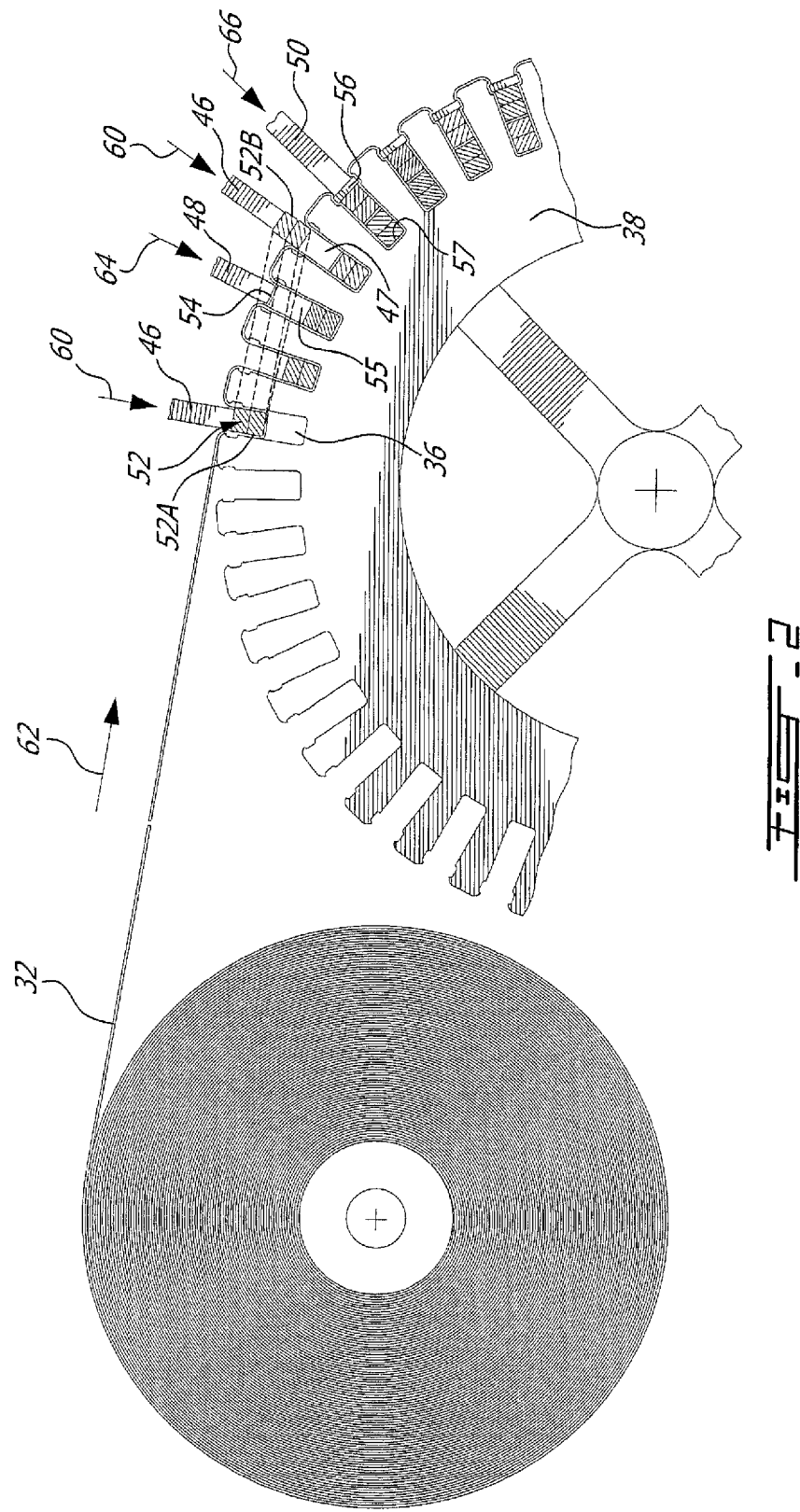
FIG. 2 is a schematic side elevational view similar to FIG. 1 illustrating the insertion of paper in a slot of the stator using the first leg of a prewound coil; the insertion of a prewound coil; the insertion an interphase insulation paper and the insertion of a wedge.

FIG. 2 illustrates the insertion of the continuous insulation paper 32 in the slot 36 via the radial movement of the first leg 52A of the prewound coil 52, caused by the radial movement of the prewound coil holders 46 (see arrows 60) towards the stator 38. This insertion of the paper 32 in the slot 36 forces some of the continuous paper 32 to be unrolled from the roll 34 (see arrow 62).

Simultaneously, both legs 52A and 52B of the prewound coil 52 are inserted in adequate slots of the stator 38. Indeed, as can be seen from FIG. 2, the second leg 52B of the prewound coil 52, pushed by the holder 46 enters a slot 47 of the stator 38 that has insulating paper and the first leg of another prewound coil already inserted therein.

The insertion of the interphase insulation paper 54 into a slot 55 of the stator 38 also begins by a radial movement of the holder 48 towards the stator 38 (see arrow 64). It is to be noted that the slot 55 already contains the first leg of a prewound coil and, after the complete insertion of the interphase insulation paper 54, is ready to receive the second leg of another prewound coil.

FIG. 2 also illustrates the insertion of the wedge 56 into a slot 57, which is filled with the legs of two prewound coils, by the radial movement of the holder 50 towards the stator 38 (see arrow 66).

It is to be noted that while the insertion of the prewound coil, the insertion of the interphase insulation paper and the insertion of the wedge are described herein as being simultaneous, this insertion could be sequential and in any order.

Figure 3:
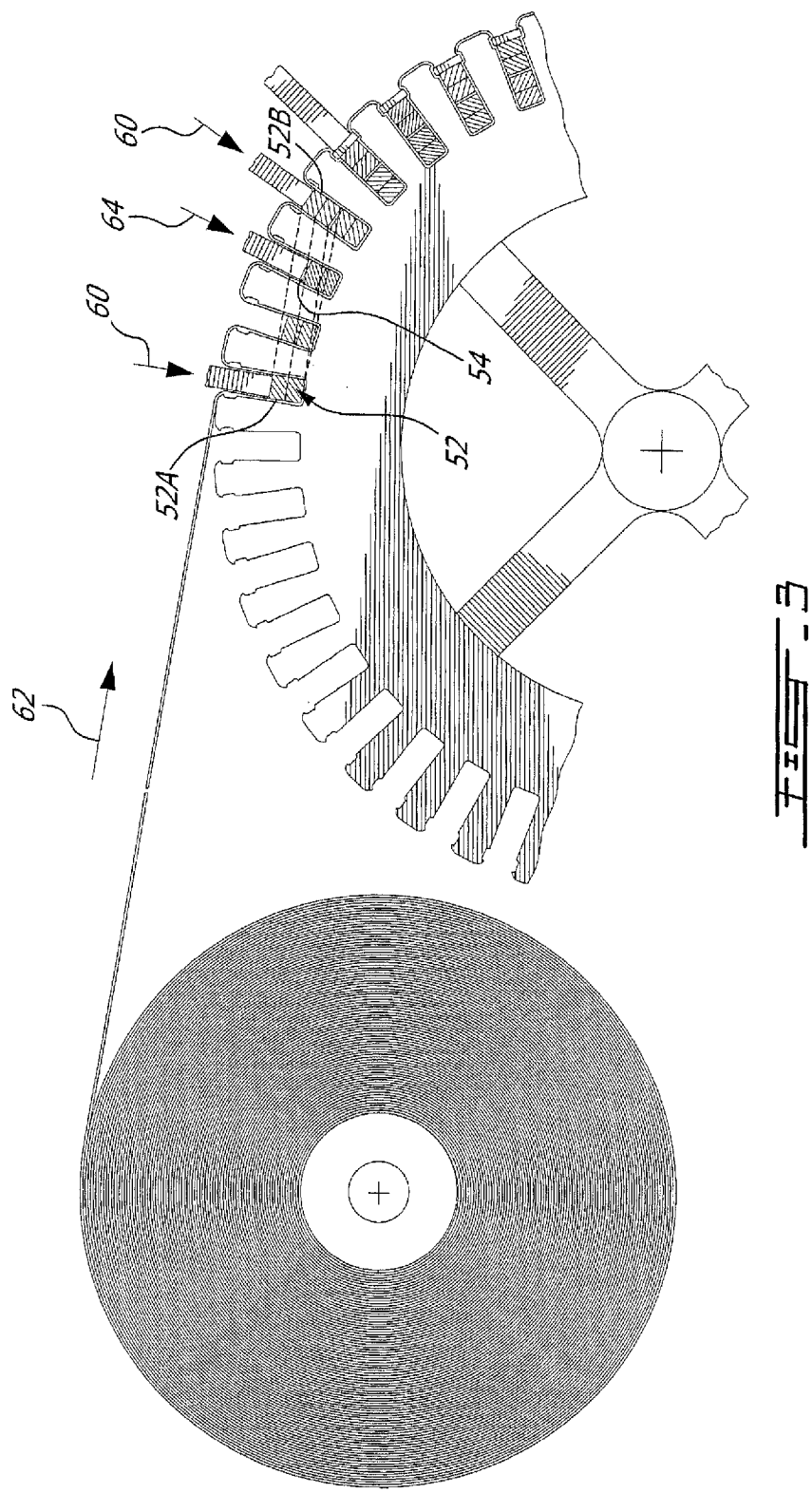
FIG. 3 is a schematic side elevational view similar to FIG. 2 illustrating the completion of the insertions.

FIG. 3 illustrates the completion of the insertions of the prewound coil 52 and of the interphase insulation paper 54 as illustrated by arrows 60 and 64, respectively.

Figure 4:
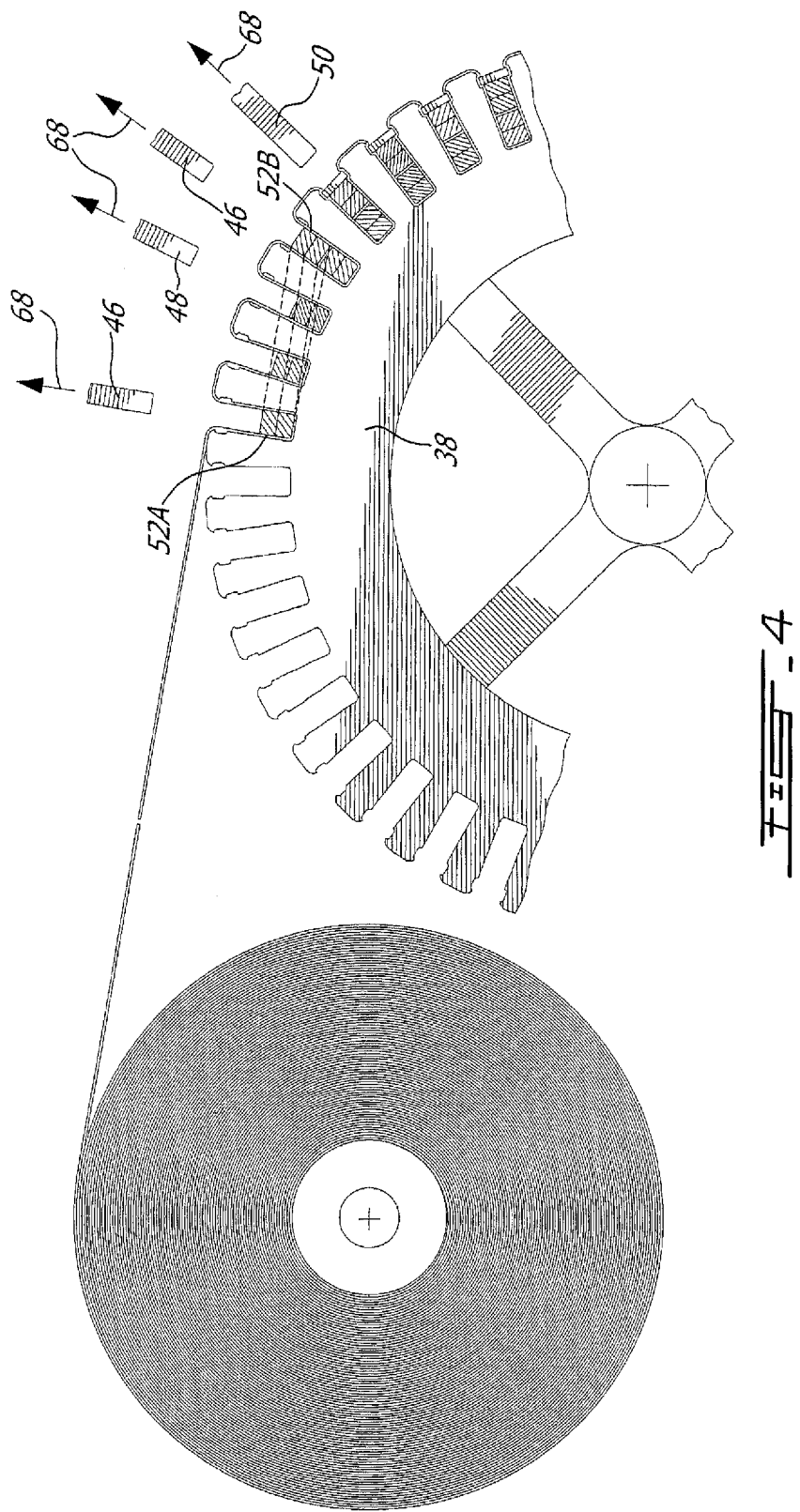
FIG. 4 is a schematic side elevational view similar to FIG. 1 illustrating the removal of the various pushing elements.

In FIG. 4, the holders 46, 48 and 50 are radially moved away from the stator 38 (see arrows 68).

Figure 5:
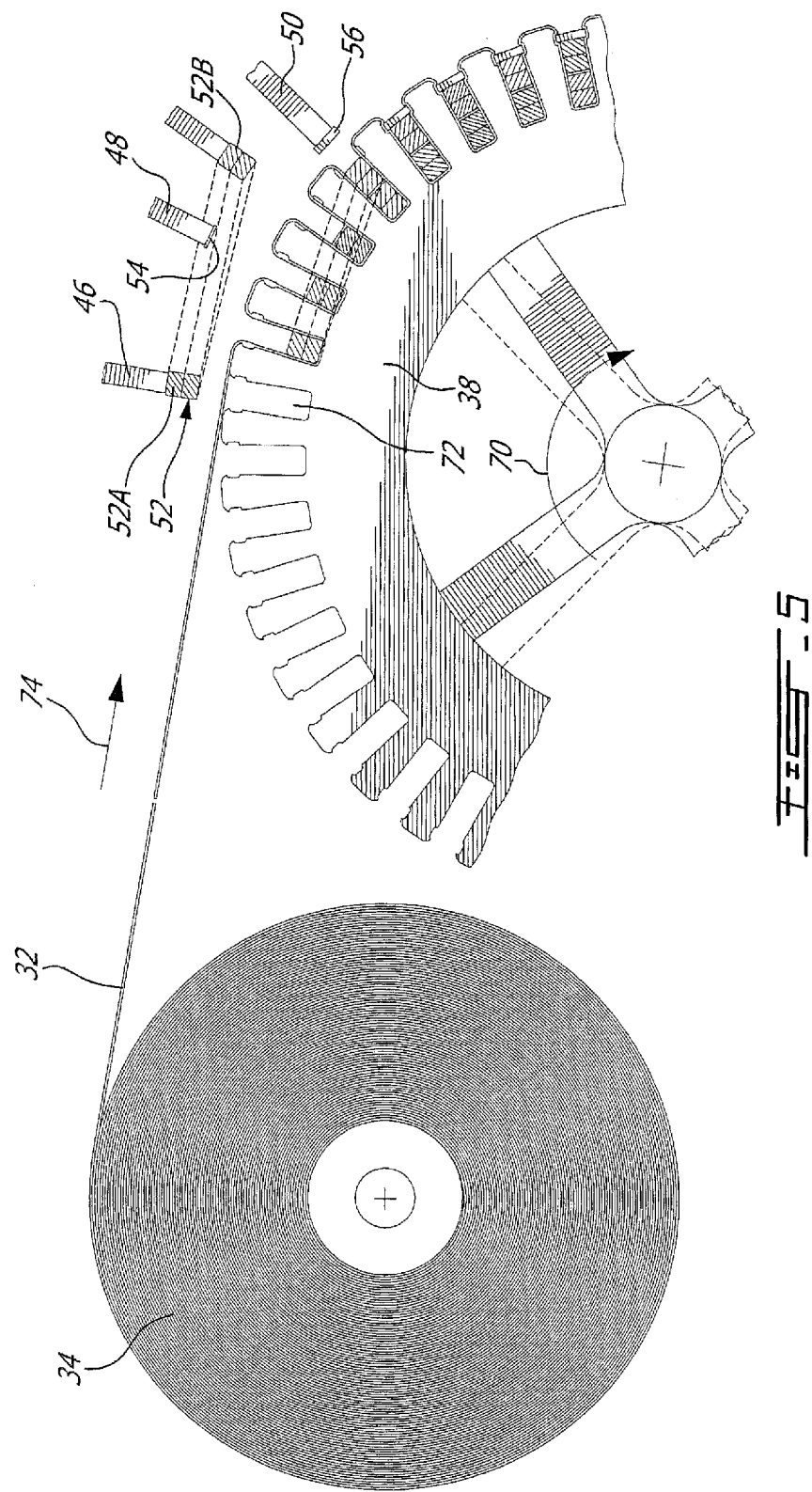
FIG. 5 is a schematic side elevational view similar to FIG. 1 illustrating the rotation of the stator of a predetermined angle; the loading of a prewound coil; the loading of an interphase insulation paper and the loading of a wedge.

Finally, as can be seen in FIG. 5, the insertion system is prepared for the next insertion. More specifically, the holders 46, 48 and 50 are respectively loaded with a prewound coil 52, an interphase insulation paper 54 and a wedge 56. The stator 38 is also rotated (see arrow 70) so that an adjacent stator slot 72 is aligned with the first leg of the coil 52. It is to be noted that this rotation of the stator 38 cause some continuous paper 32 to be unrolled from the roll 34 (see arrow 74).

The insertion of the continuous insulation paper, prewound coils, interphase insulation paper and wedges continues by repeating the steps illustrated in FIGS. 1 to 5 until all but the last three slots of the stator are filled.

It is to be noted that the above steps are performed after the first legs of three prewound coils are inserted in three adjacent slots of the stator. Thee first legs of these three coils can be inserted manually. Similarly, the last three coils to be inserted in the slots of the stator can be inserted manually.

Turning now to FIGS. 6 to 16 of the appended drawings an insertion system 100 according to a second illustrative embodiment will be described. Since the continuous paper insertion system 100 is very similar to the continuous paper insertion system 30 described hereinabove, only the differences therebetween will be described hereinbelow.

Generally stated, the main difference between the insertion system 100 and the insertion system 30 is that the insertion system 100 includes prewound coil guide assemblies 102 and 104 to control the insertion of the prewound coils and a paper management hook 106 to control the paper unrolling from the continuous paper roll 34.

The prewound coil guide assembly 102 includes a first guide 108 and a second guide 110 that are radially mobile and that are so configured and positioned as to define a passageway 112 therebetween. The passageway 112 is sized to receive a first leg of a prewound coil. The assembly 102 also includes a radially mobile pushing element 113. The first guide 108 is slightly longer than the second guide 110 so as to make contact with the paper 32 when the guide assembly 102 is radially moved towards the stator 38. It is to be noted that the radial movements of the prewound coil guide assembly 102 may be controlled by a controller (not shown) or be manually actuated.

Similarly, the prewound coil guide assembly 104 includes a first guide 114 and a second guide 116 that are so configured and positioned as to define a passageway 118 therebetween. The passageway 118 is sized to receive a second leg of a prewound coil. The assembly 104 also includes a radially mobile pushing element 119.

The prewound coil guide assemblies 102, 104 and the radially mobile pushing elements 113 and 119 form a prewound coil holder.

The paper management hook 106 includes a paper contacting portion 120 so configured and sized as to releasably hook the continuous paper 32. The paper management hook 106 may be moved along an axis 122 as will be described hereinbelow. It is to be noted that the movements of the hook 106 along axis 122 may be controlled by a controller (not shown) or be manually actuated.

The operation of the insertion system 100 will now be described with reference to FIGS. 6-16.

Figure 6:
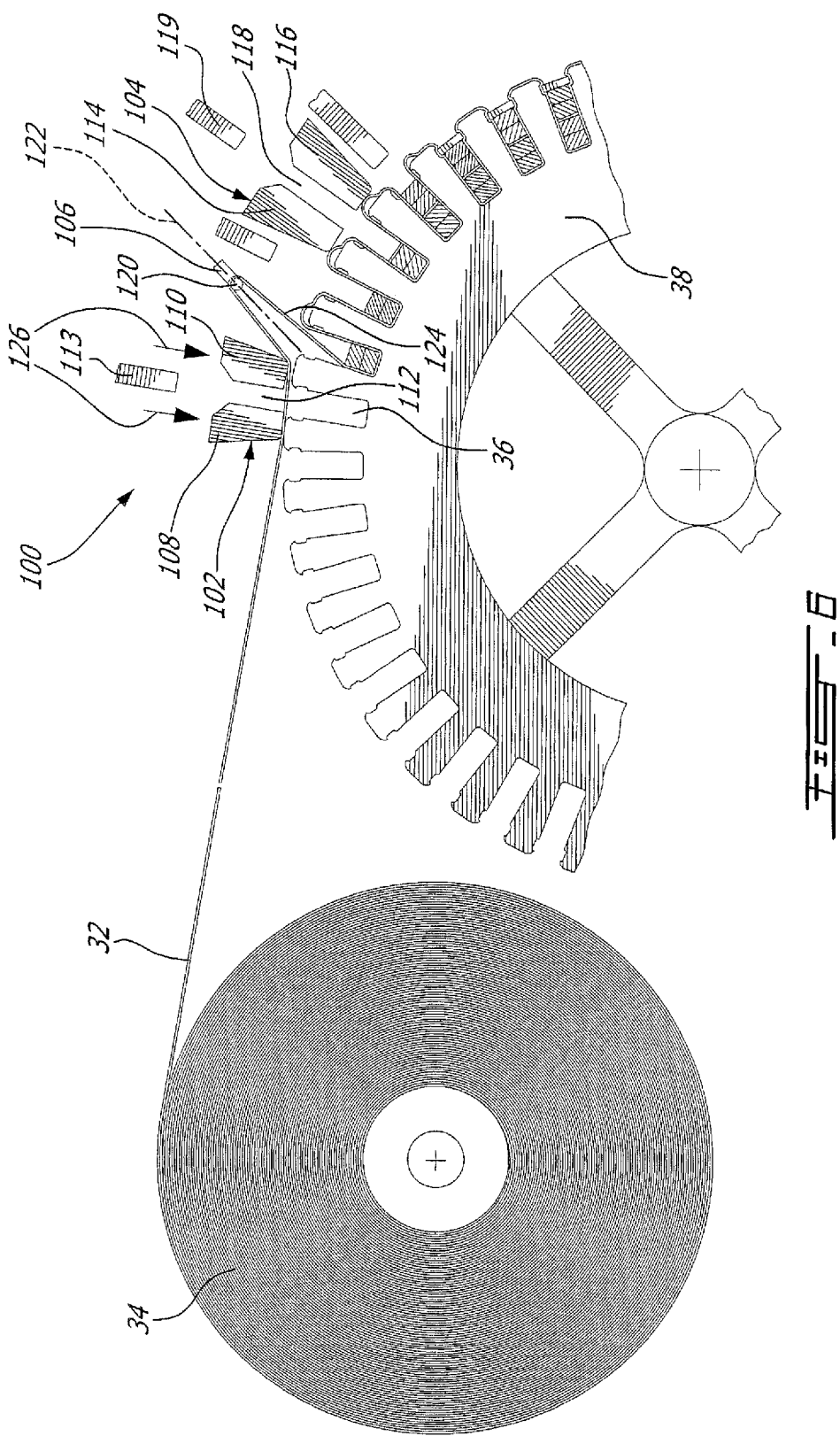
FIG. 6 is a schematic side elevational view of a portion of a stator mounted to an insertion system according to a second illustrative embodiment; this figure illustrating the lowering of a first prewound coil guide.

In FIG. 6 the stator 38 has been mounted to the insertion system 100 and some slots have been totally or partially filled with insulation paper 32 and prewound coils. FIG. 6 shows a predetermined length 124 of paper 32 that has been hooked by the hook 106 and pulled from the roll 34. The first prewound coil guide assembly 102 is then moved towards the stator 38 (see arrows 126) until the guide 108 clamps the paper 32 to the stator 38 to prevent further unrolling of the paper 32 from the roll 34.

Figure 7:
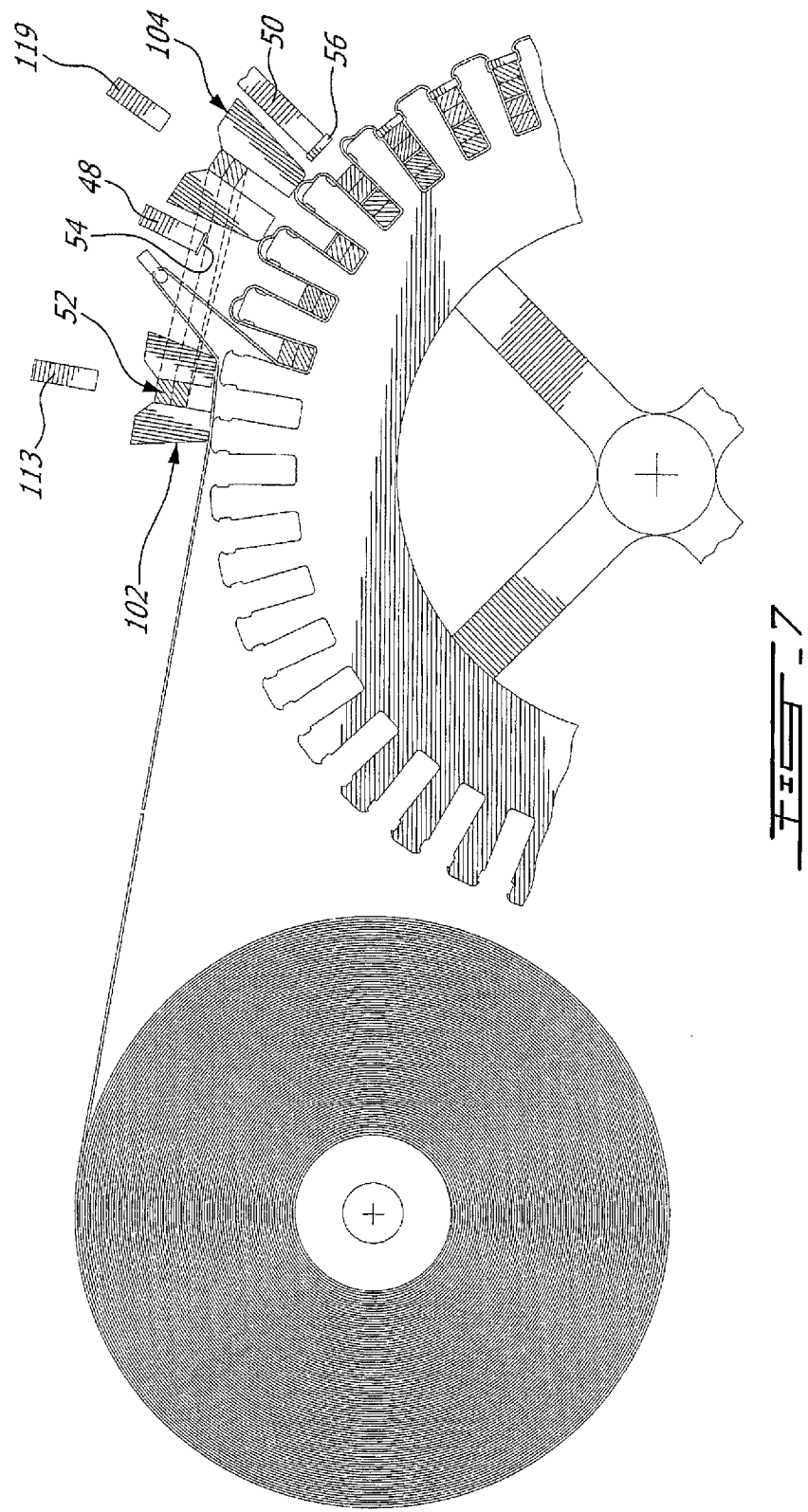
FIG. 7 is a schematic side elevational view similar to FIG. 6 illustrating the loading the loading of a prewound coil; the loading of an interphase insulation paper and the loading of a wedge.

FIG. 7 illustrates the loading of a prewound coil 52 between the guide assemblies 102 and 104; the loading of an interphase insulation paper 54 to the holder 48 and the loading of a wedge 56 to the holder 50.

Figure 8:
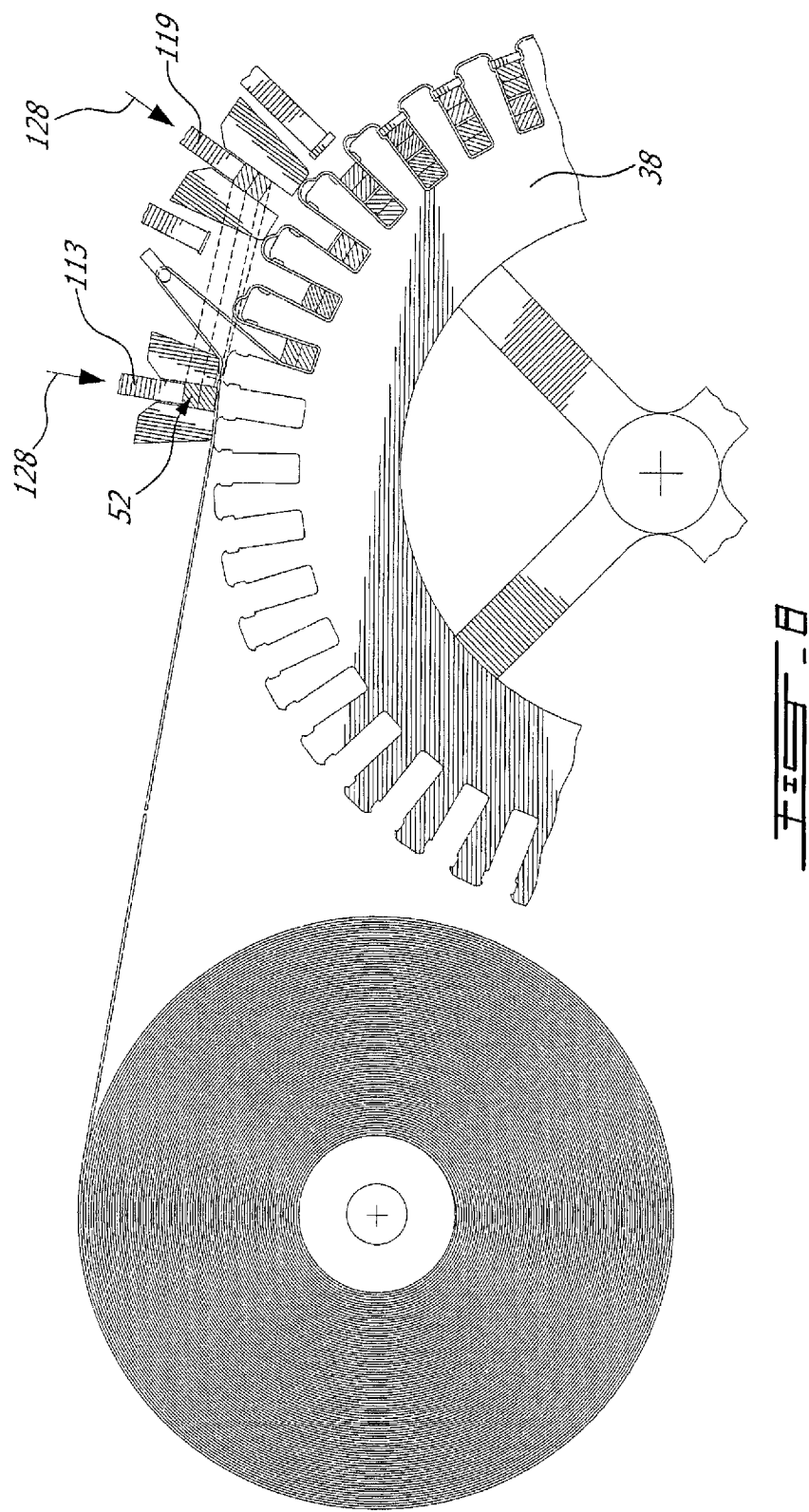
FIG. 8 is a schematic side elevational view similar to FIG. 6 illustrating the beginning of the insertion of the prewound coil.

FIG. 8 illustrates the beginning of the insertion of the prewound coil 52 by the pushing action of the pushing elements 113 and 119 (see arrows 128). FIG. 8 illustrates the system 100 when the first leg of the prewound coil 52 enters in contact with the paper 32.

Figure 9:
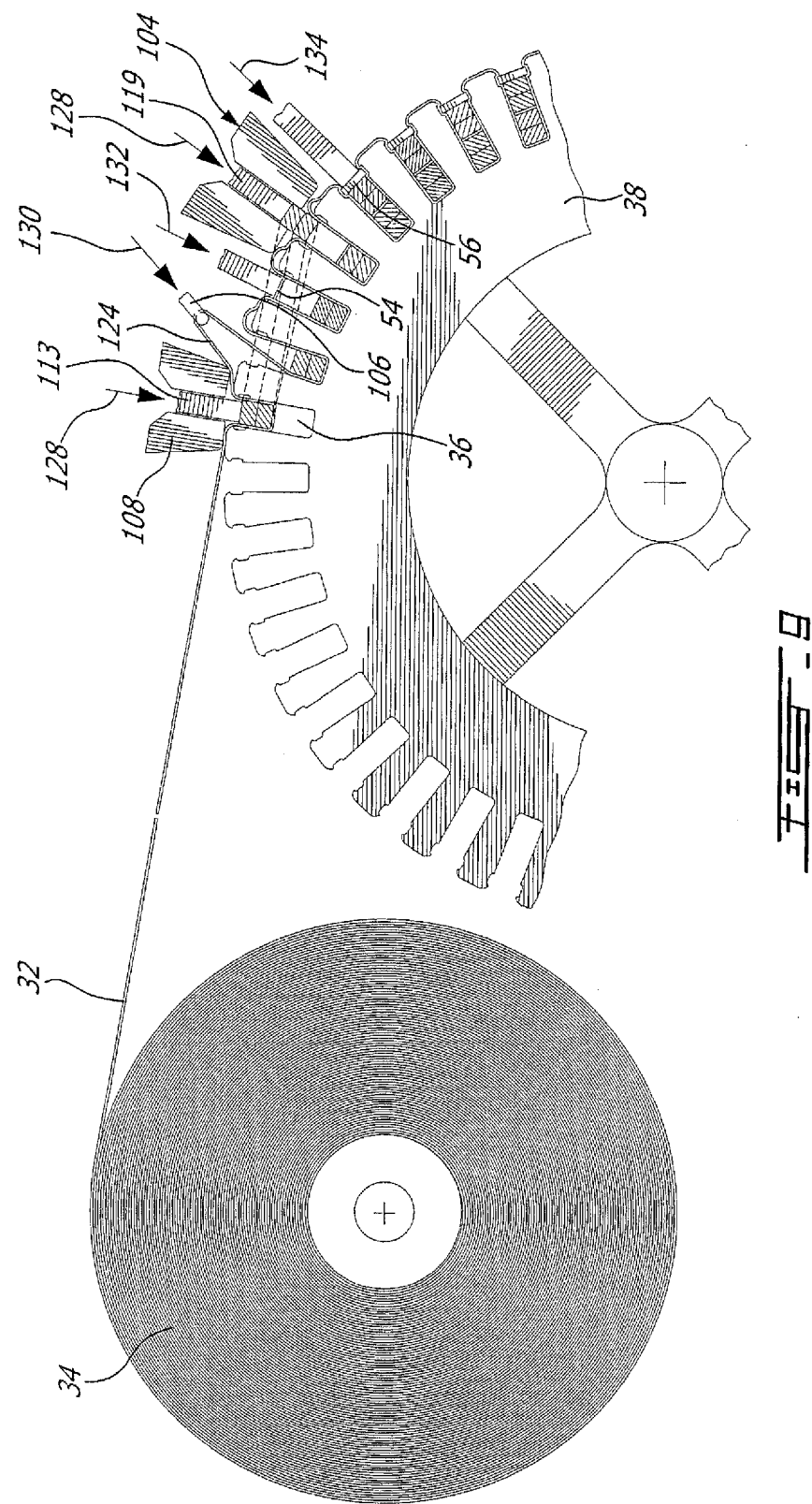
FIG. 9 is a schematic side elevational view similar to FIG. 6 illustrating the insertion of paper in a slot of the stator using the first leg of a prewound coil; the insertion of a prewound coil; the insertion an interphase insulation paper and the insertion of a wedge.

FIG. 9 illustrates the insertion of the paper 32 in the slot 36 of the stator using the first leg of a prewound coil 52. Indeed, the pushing element 113 pushes onto the prewound coil 52 (see arrow 128) that, in turn, pushes the paper 32 in the slot 36. Or course, the coil 52 is inserted in the slot 36 by the same movement. Since the guide 108 prevents paper from being unrolled from the roll 34, the paper entering the slot 36 comes from the length of paper 124 hooked to the paper management hook 106 that moves towards the stator 38 (see arrow 130).

Of course, as can be seen from FIG. 9, the second leg of the prewound coil 52, guided by the second guide assembly 104 enters a slot of the stator 38 that has insulating paper and the first leg of another prewound coil already inserted therein.

FIG. 9 also illustrates the beginning of the insertion of the interphase insulation paper 54 (see arrow 132) and the insertion of the wedge 56 (see arrow 134).

Figure 10:
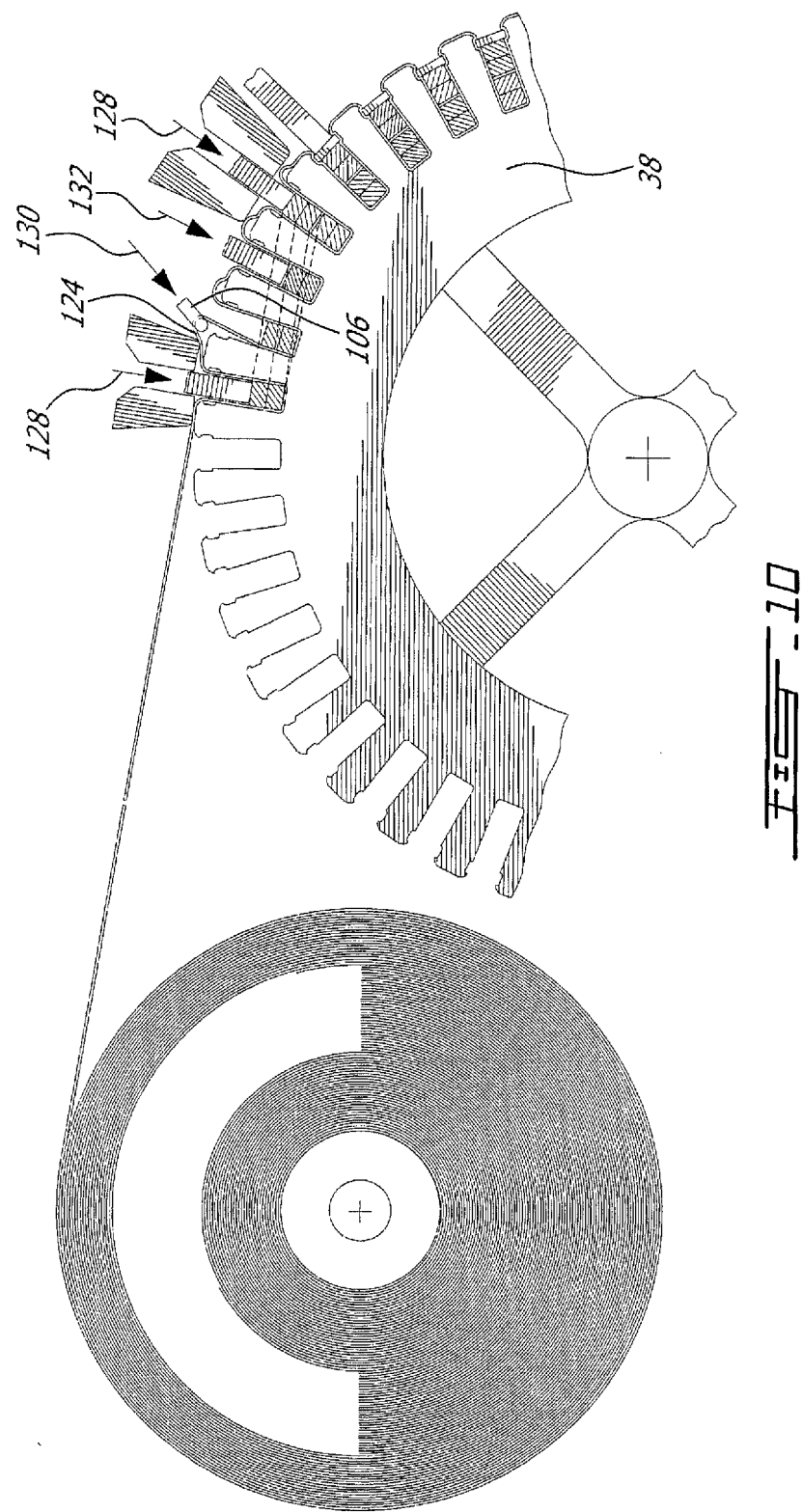
FIG. 10 is a schematic side elevational view similar to FIG. 6 illustrating the completion of the insertion of the paper in a slot of the stator, of the prewound coil and of the interphase insulation paper.

FIG. 10 illustrates the completion of the insertion of the paper 32 and of the first leg of the prewound coil 52 in the slot 36 of the stator 38 (see arrow 128). Again, the paper entering the slot 36 comes from the length of paper hooked to the hook 106 (see arrow 130).

FIG. 10 also illustrates the end of the insertion of the interphase insulation paper 54 (see arrow 132).

Figure 11:
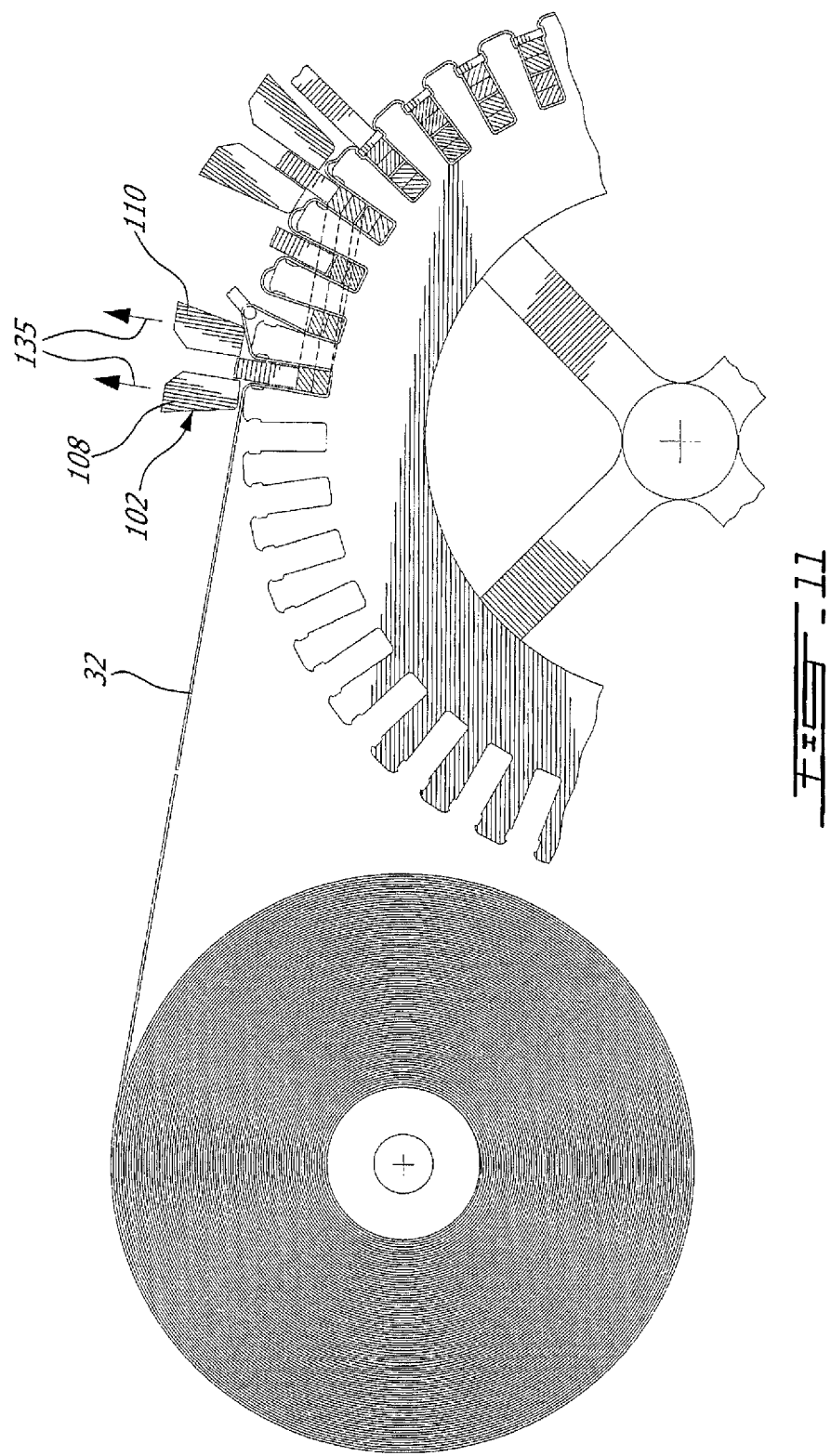
FIG. 11 is a schematic side elevational view similar to FIG. 6 illustrating the raising of the first prewound coil guide.

The first prewound guide assembly 102 may then be moved away from the stator 38 (see arrows 135 in FIG. 11). One skilled in the art will understand that while the entire assembly 102 is moved away from the stator in the embodiment of FIG. 11, only the guide 108 is required to be moved away to free the paper 32.

Figure 12:
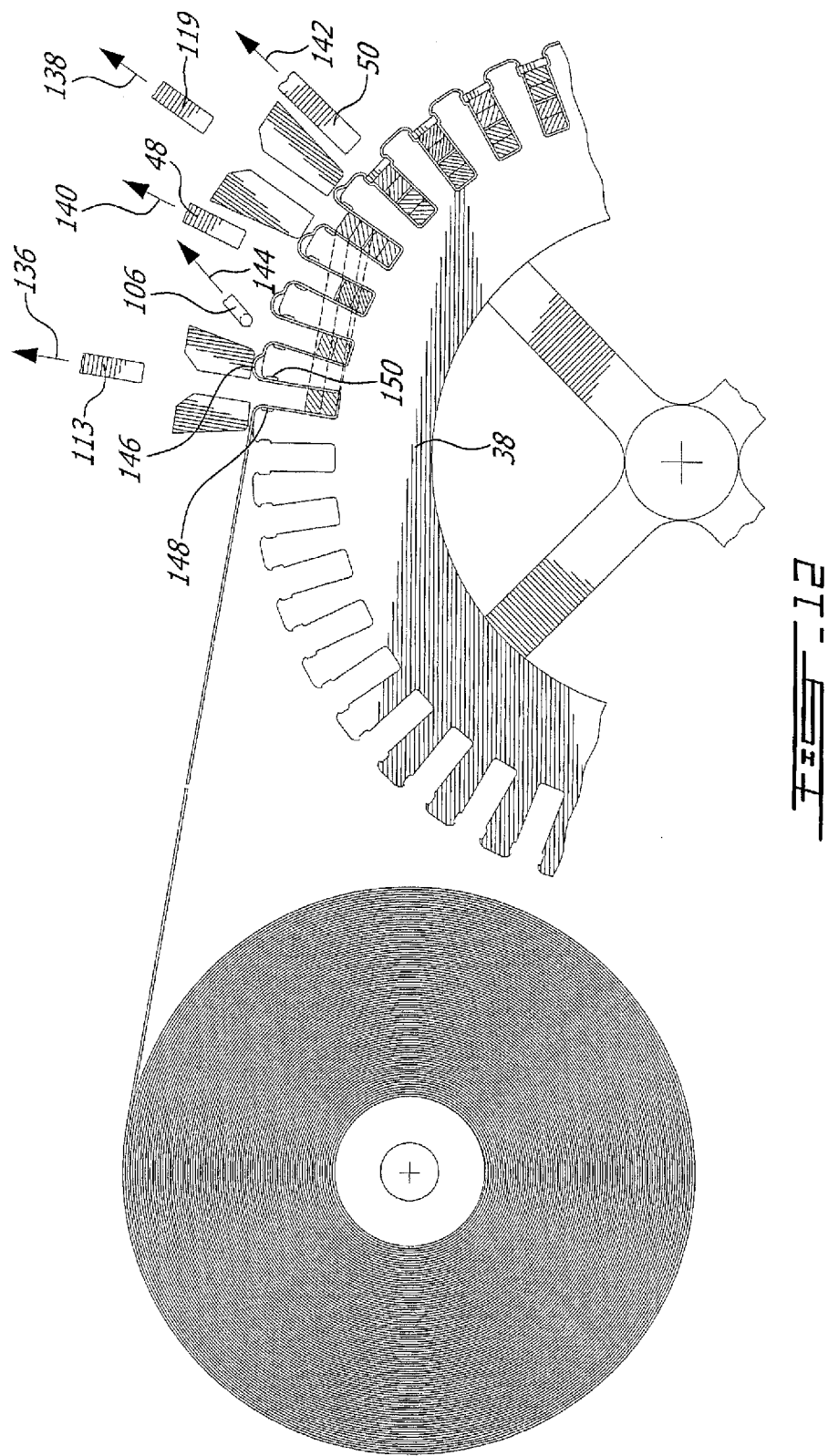
FIG. 12 is a schematic side elevational view similar to FIG. 6 illustrating the removal of the various pushing elements and of the paper management hook.

FIG. 12 illustrate the removal of the various pushing elements 113, 119 of the holders 48, 50 and of the paper management hook 106 (see arrows 136-138, 140-142 and 144, respectively).

It is to be noted that the steps illustrated by FIGS. 11 and 12 could easily be done in the reverse order.

As can be seen from FIG. 12, some of the insulating paper from the length of paper that was hooked to the hook 106 has not yet entered the slots of the stator (see loop 146, for example). This paper is intended to enter the indentations 148 and 150 when pushed therein by the insertion of the wedge 56.

Figure 13:
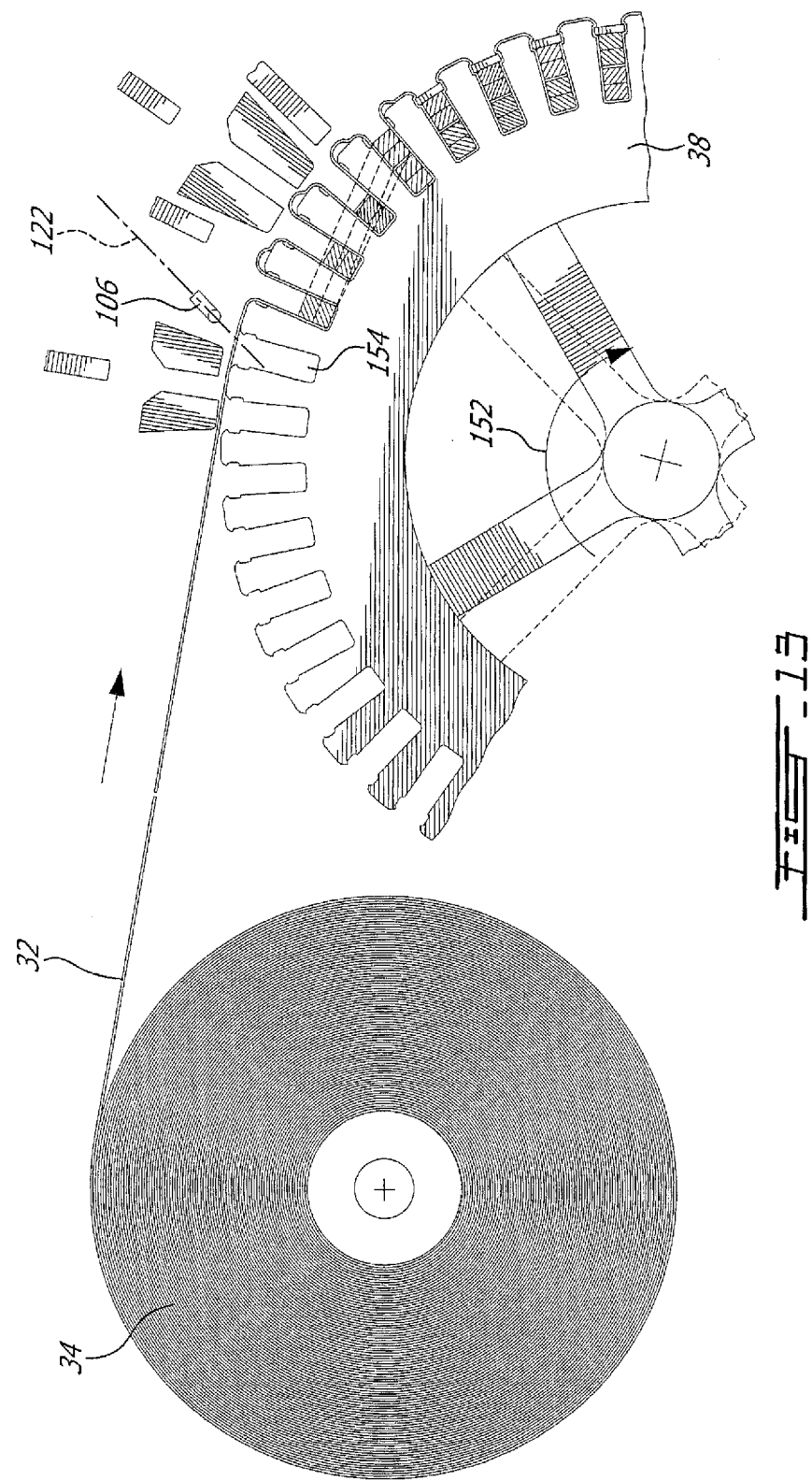
FIG. 13 is a schematic side elevational view similar to FIG. 6 illustrating the rotation of the stator of a predetermined angle.

FIG. 13 shows the rotation of the stator 38 of a predetermined angle (see arrow 152) so that the next slot 154 to receive the first leg of a prewound coil is aligned with the movement axis 122 of the paper management hook 106. Of course, rotation of the stator 38 causes some paper 32 to be unrolled from the roll 34.

Figure 14:
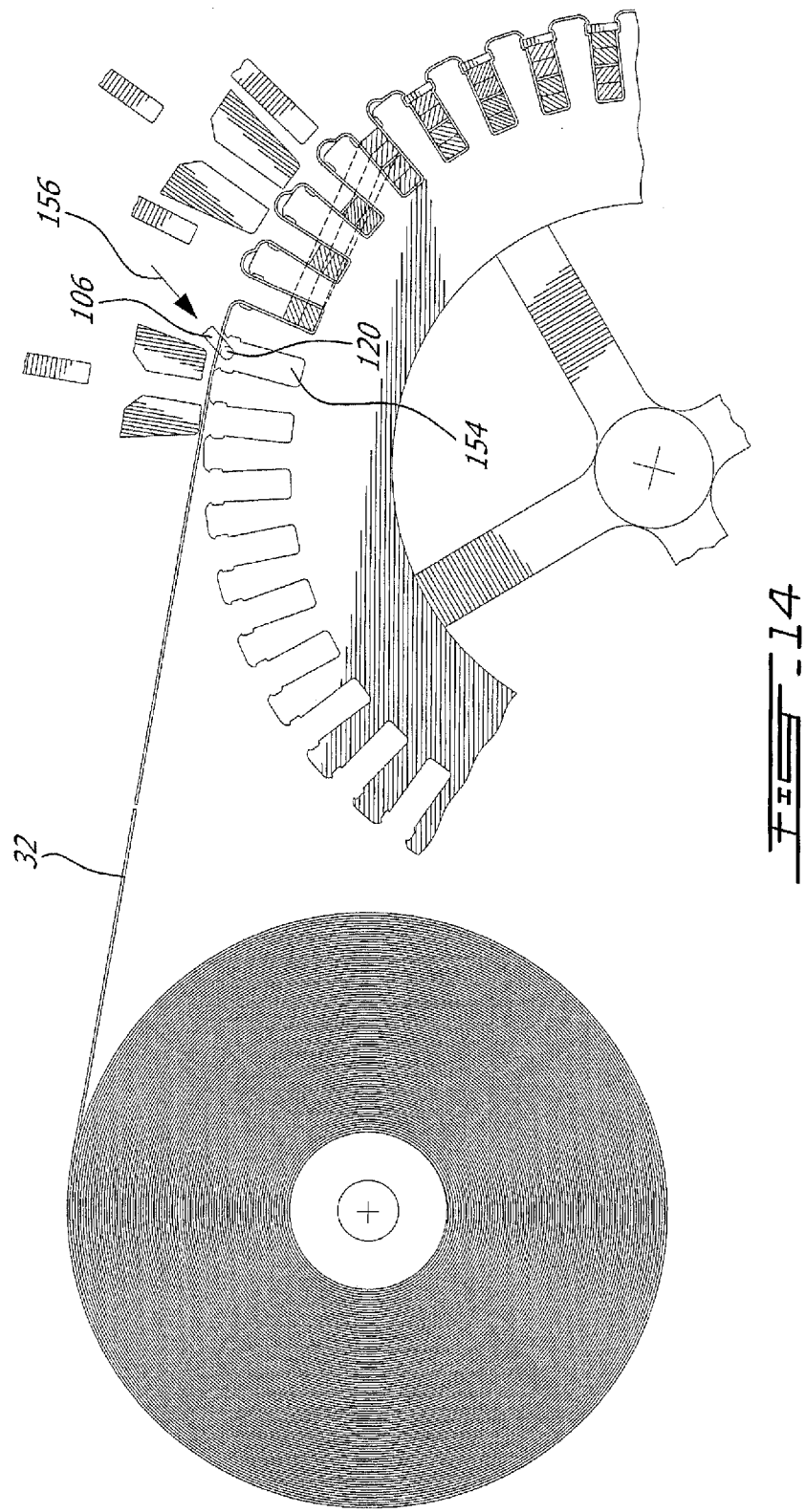
FIG. 14 is a schematic side elevational view similar to FIG. 6 illustrating the hooking of the insulation paper by the paper management hook.

In FIG. 14, the paper management hook 106 moves in the slot 154 (see arrow 156) so that the paper contacting portion 120 hooks with the paper 32.

Figure 15:
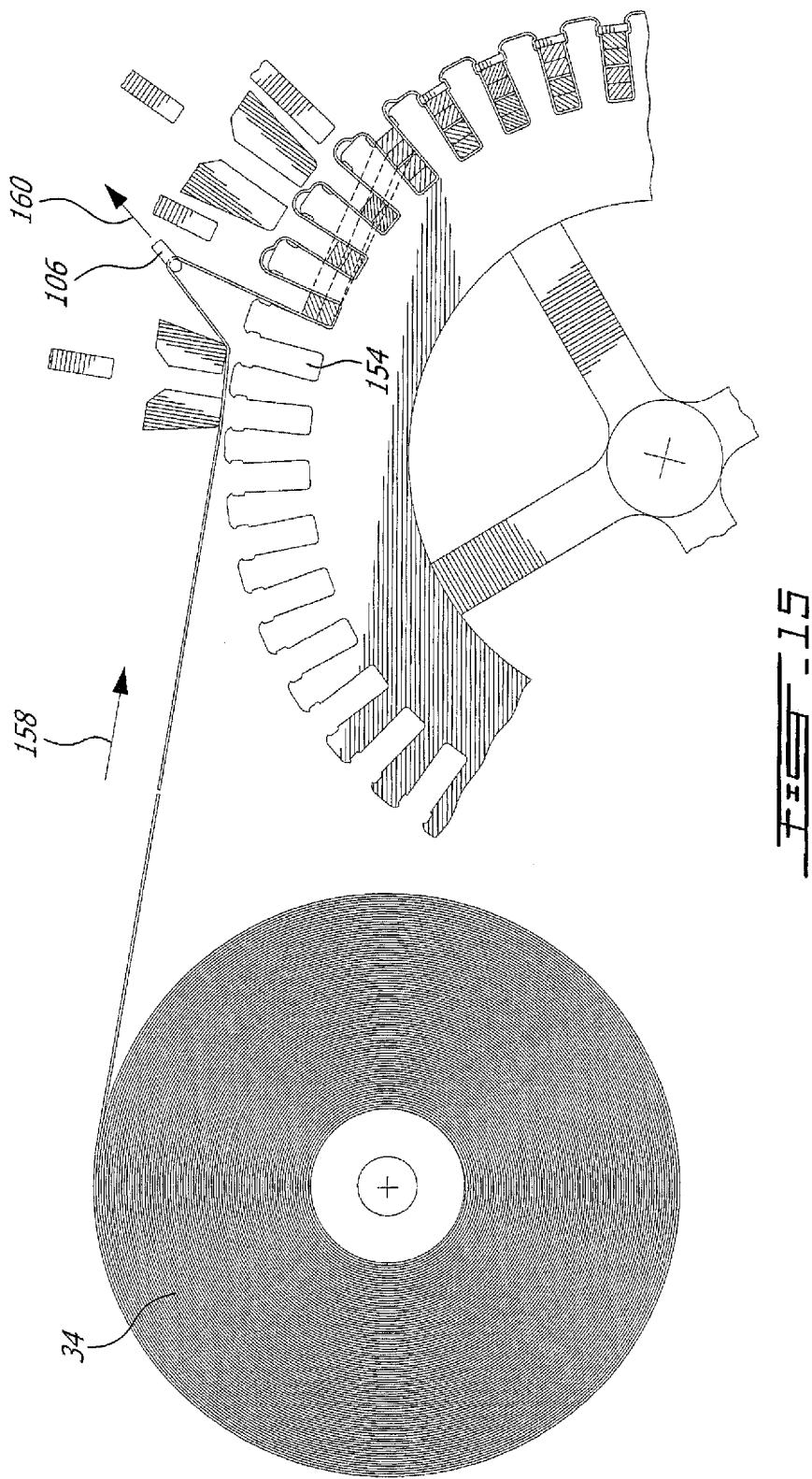
FIG. 15 is a schematic side elevational view similar to FIG. 6 illustrating the pulling of a quantity of paper from the roll by the paper management hook.

Then, as shown in FIG. 15, a predetermine length of paper may be unrolled from the roll 34 (see arrow 158) by the pulling action of the paper management hook 106 along axis 122 (see arrow 160).

Figure 16:
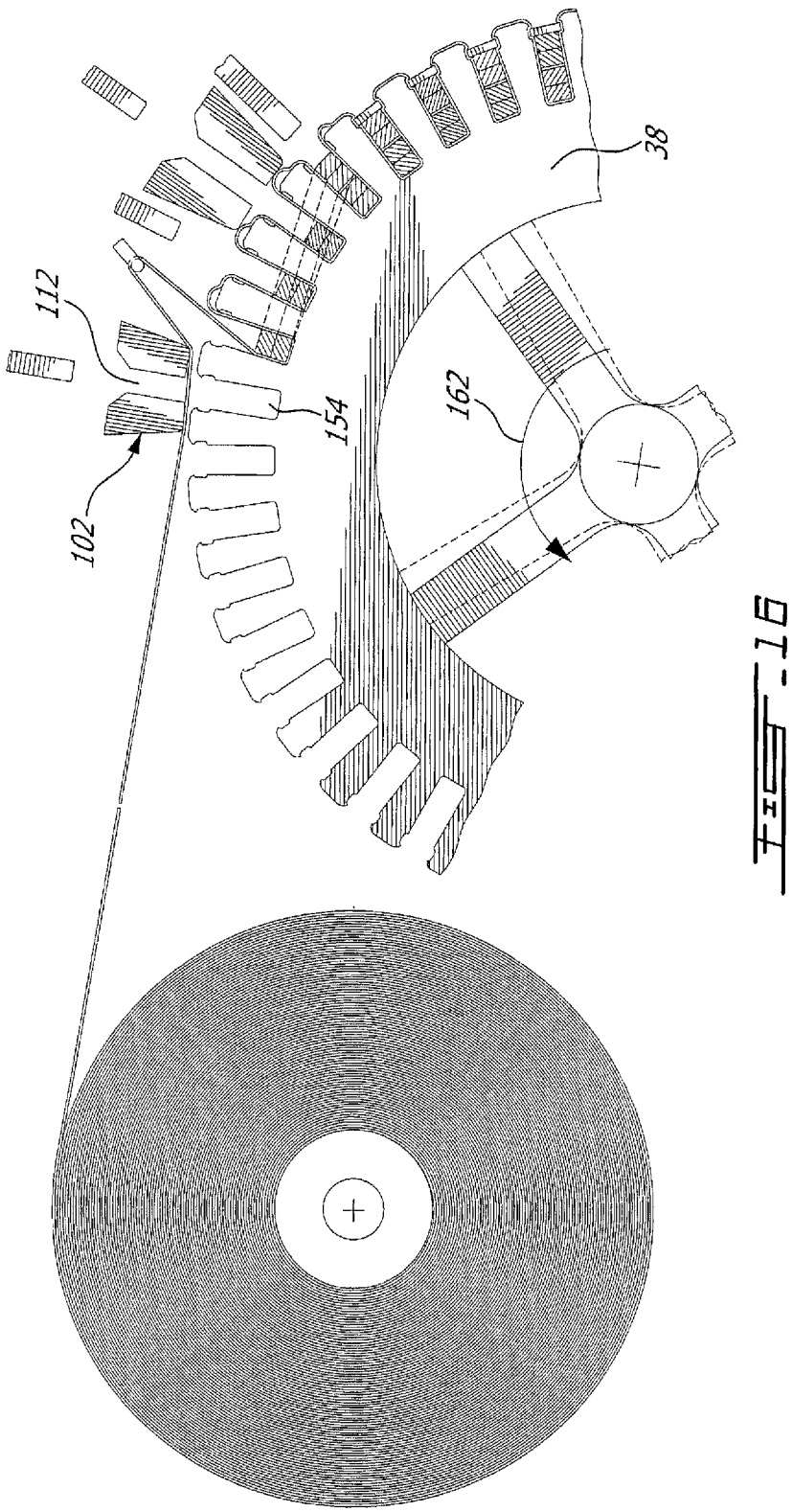
FIG. 16 is a schematic side elevational view similar to FIG. 6 illustrating the reverse rotation of the stator of a predetermined angle.

Finally, FIG. 16 illustrates the reverse rotation of the stator 38 (see arrow 162) of a predetermined angle so as to position the slot 154 in alignment with the passageway 112 of the first prewound coil guide assembly 102.

The steps of FIGS. 6 to 16 can then be repeated until all the slots of the stator are filled, as described hereinabove.

Turning now to FIGS. 17-25 of the appended drawings, an insertion system 200 according to a third illustrative embodiment will be described.

It is to be noted that since the insertion system 200 is similar to the insertion system 100 illustrated in FIGS. 6-16, only the differences therebetween will be discussed hereinbelow for concision purpose.

Generally stated, the insertion system 200 includes a second paper management hook 202 and a paper clamp 204 selectively preventing paper 32 to be unrolled from the paper roll 34 during the insertion process. Accordingly, both guides of the first prewound coil guide assembly 206 are the same length.

Figure 17:
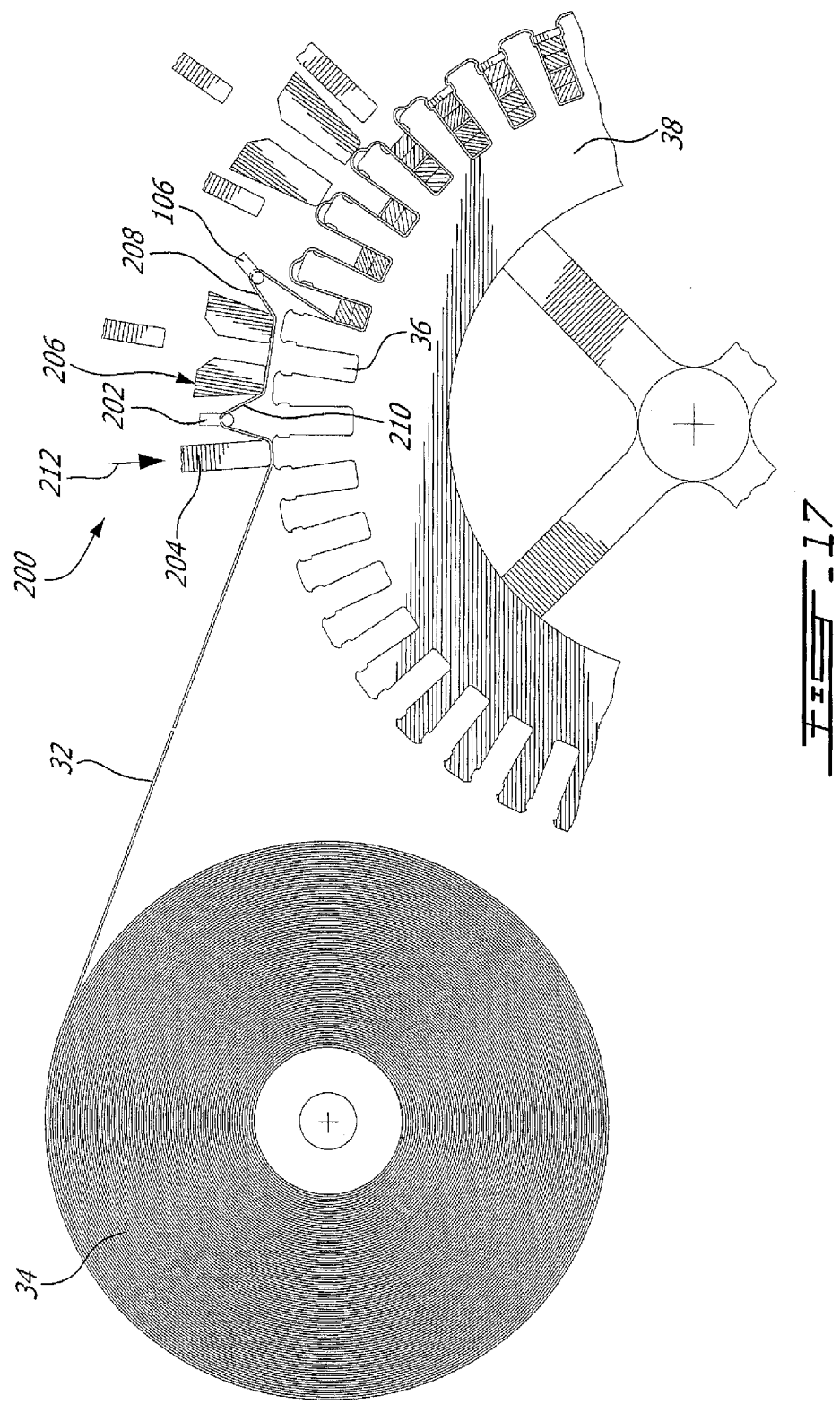
FIG. 17 is a schematic side elevational view of a portion of a stator mounted to an insertion system according to a third illustrative embodiment; this figure illustrating the lowering of a paper clamp.

As can be seen from FIG. 17, the second paper management hook 202 is similar to the paper management hook 106 but is located on the other side of the first prewound coil guide assembly 206 and the displacement axis of this hook is generally radial.

The operation of the insertion system 200 will now be described with reference to FIGS. 17-25 of the appended drawings.

In FIG. 17 the stator 38 has been mounted to the insertion system 200 and some slots have been totally or partially filled with insulation paper 32 and prewound coils. FIG. 17 shows a first predetermined length 208 of paper 32 that has been hooked by the paper management hook 106 and second predetermined length 210 of paper 32 that has been hooked by the second paper management hook 202. The paper clamp 204 is then moved towards the stator 38 (see arrows 212) until the paper 32 is clamped to the stator 38 to prevent further unrolling of the paper 32 from the roll 34.

Figure 18:
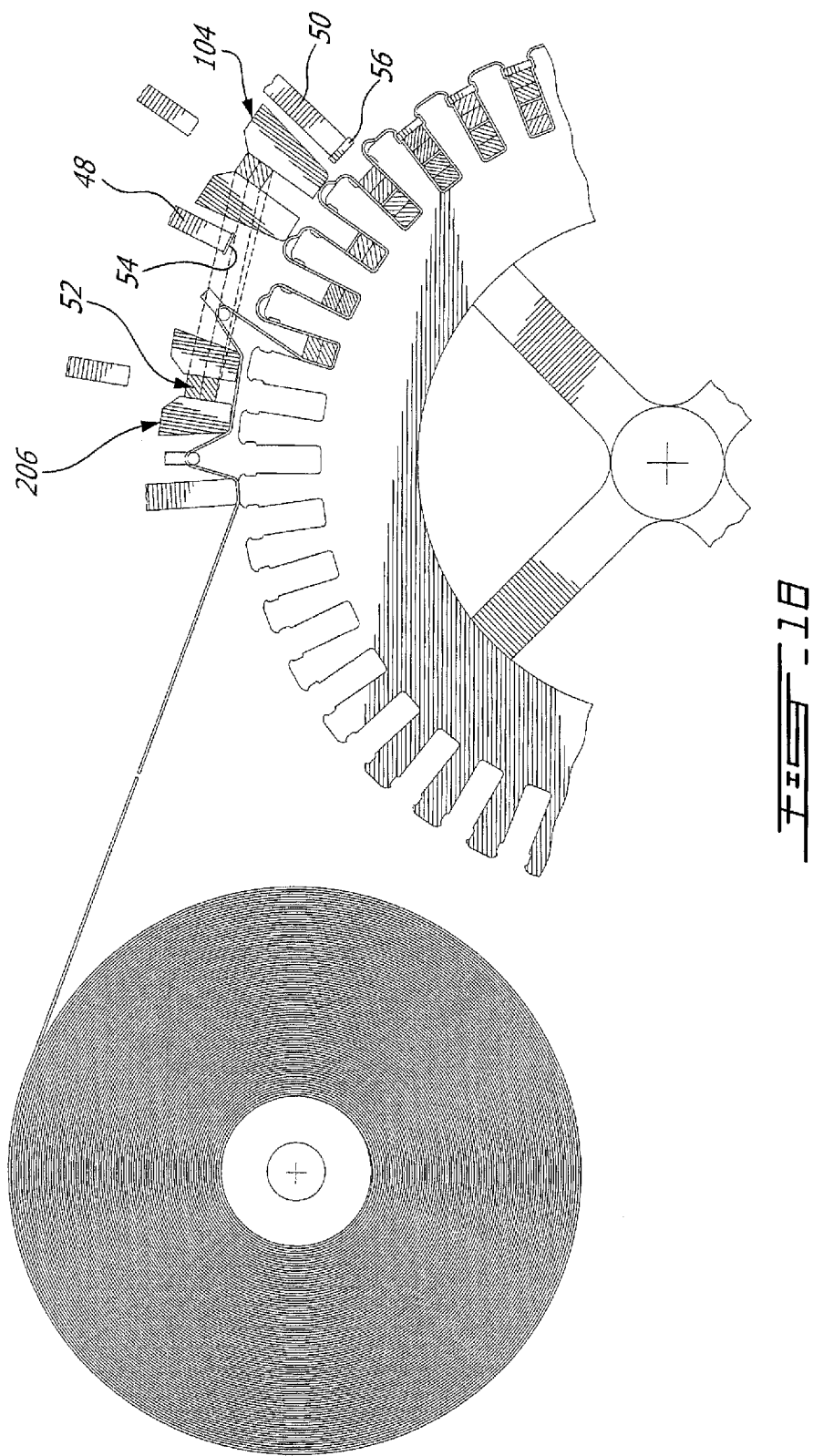
FIG. 18 is a schematic perspective view similar to FIG. 17, illustrating the loading the loading of a prewound coil; the loading of an interphase insulation paper and the loading of a wedge.

FIG. 18 illustrates the loading of a prewound coil 52 between the guide assemblies 206 and 104; the loading of an interphase insulation paper 54 to the holder 48 and the loading of a wedge 56 to the holder 50.

Figure 19:
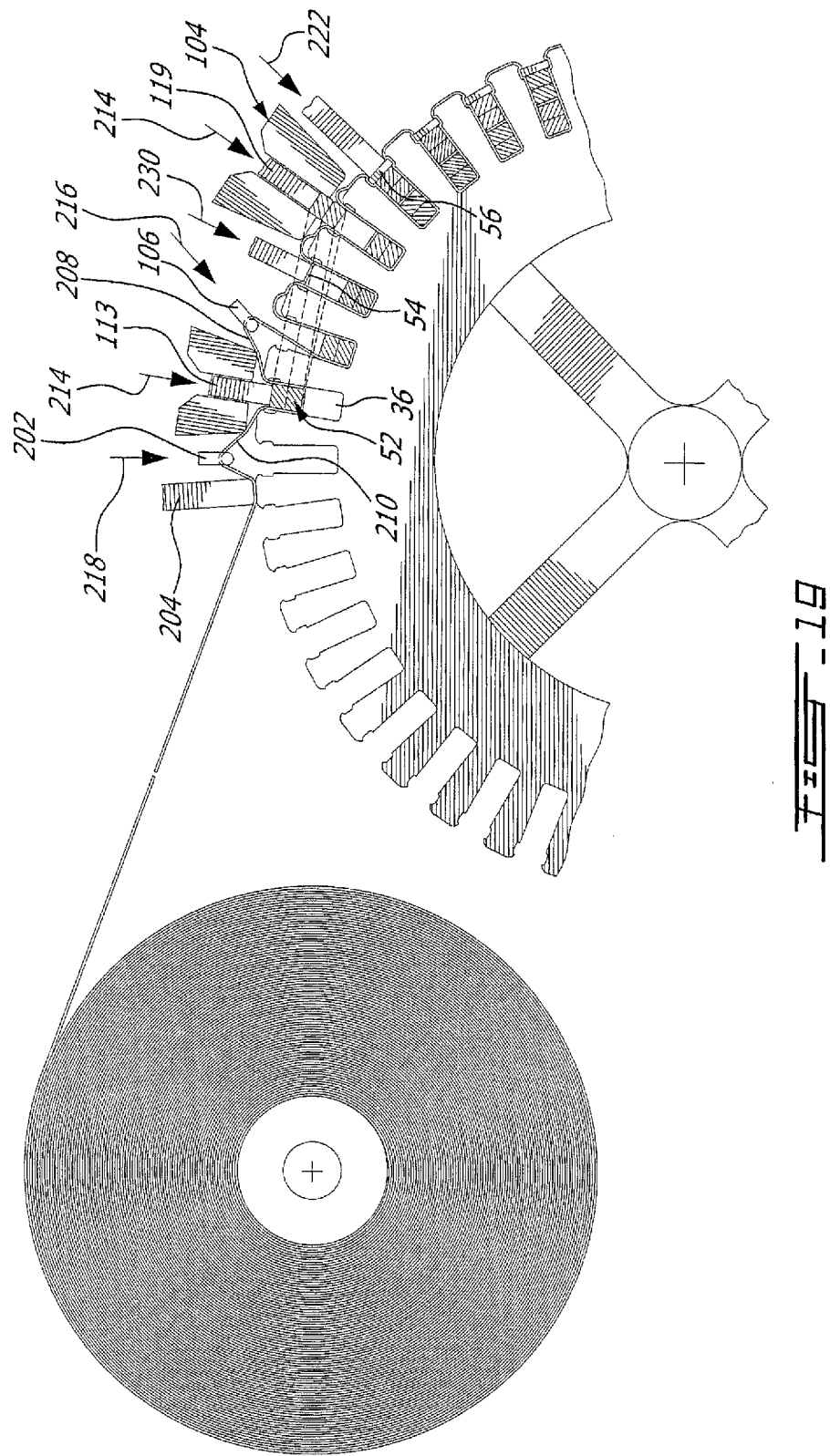
FIG. 19 is a schematic perspective view similar to FIG. 17, illustrating the beginning of the insertion of the insulation paper, the beginning of the insertion of the prewound coil, the beginning of the insertion of the interphase insulation paper and the insertion of the wedge.

FIG. 19 illustrates the insertion of the prewound coil 52 by the pushing action of the pushing elements 113 and 119 (see arrows 214) onto the prewound coil. The pushing element 113 pushes onto the prewound coil 52 that, in turn, pushes the paper 32 in the slot 36. Or course, the coil 52 is inserted in the slot 36 by the same movement. Since the paper clamp 204 prevents paper 32 from being unrolled from the roll 34, the paper entering the slot 36 comes from the first and second lengths of paper 208 and 210 hooked to the paper management hooks 106 and 202 that move towards the stator 38 (see arrows 216 and 218).

Of course, as can be seen from FIG. 19, the second leg of the prewound coil 52, guided by the second guide assembly 104 enters a slot of the stator 38 that has insulating paper and the first leg of another prewound coil already inserted therein.

FIG. 19 also illustrates the beginning of the insertion of the interphase insulation paper 54 (see arrow 220) and the insertion of the wedge 56 (see arrow 222).

Figure 20:
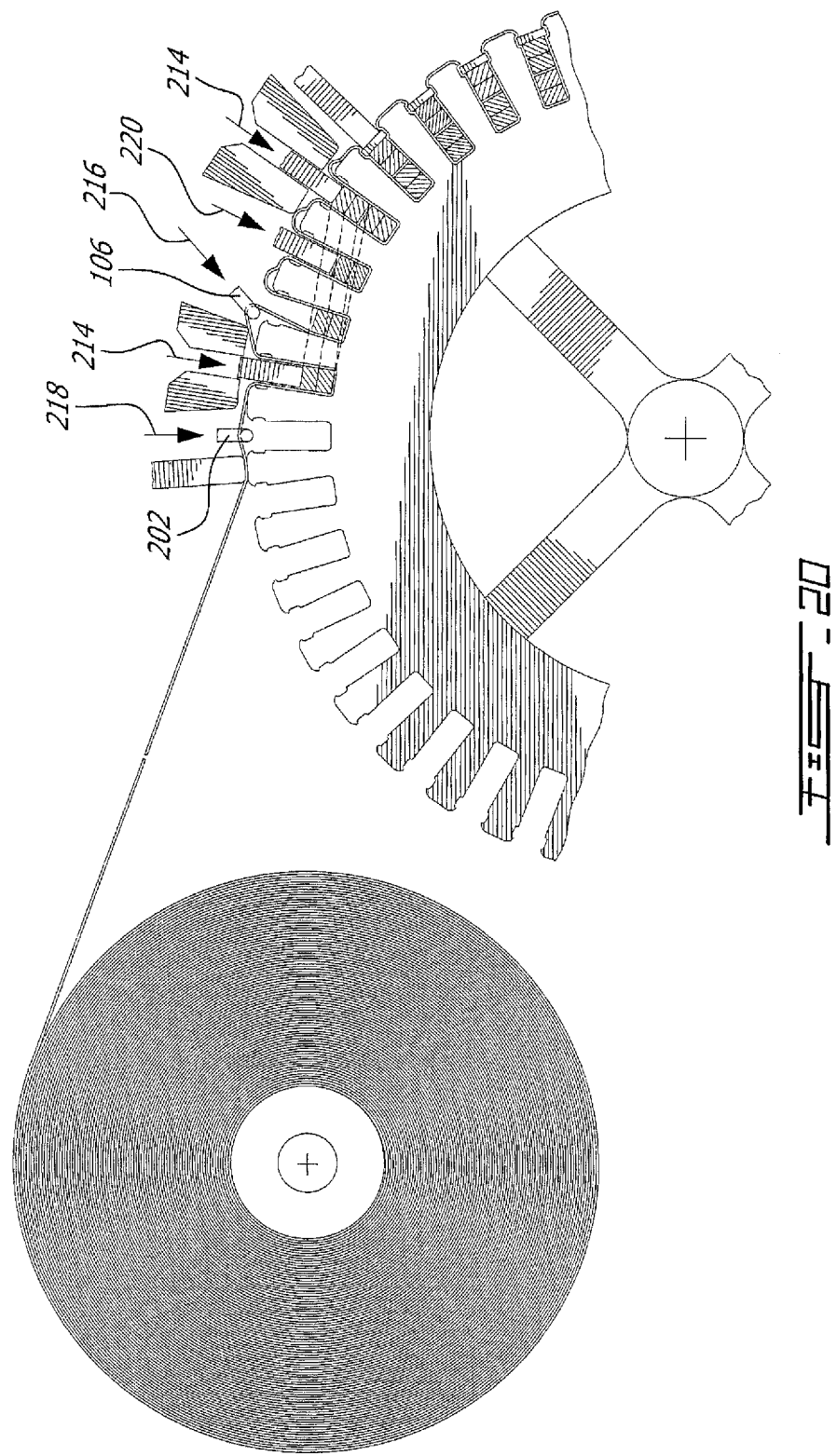
FIG. 20 is a schematic perspective view similar to FIG. 17, illustrating the completion of the insertion of the insulation paper in a slot of the stator, the completion of the insertion of the prewound coil and the completion of the insertion of the interphase insulation paper.

FIG. 20 illustrates the completion of the insertion of the paper 32 and of the first leg of the prewound coil 52 in the slot 36 of the stator 38 (see arrow 214). Again, the paper entering the slot 36 comes from the length of paper hooked to the hooks 106 and 202 (see arrows 216 and 218).

FIG. 20 also illustrates the end of the insertion of the interphase insulation paper 54 (see arrow 220).

Figure 21:
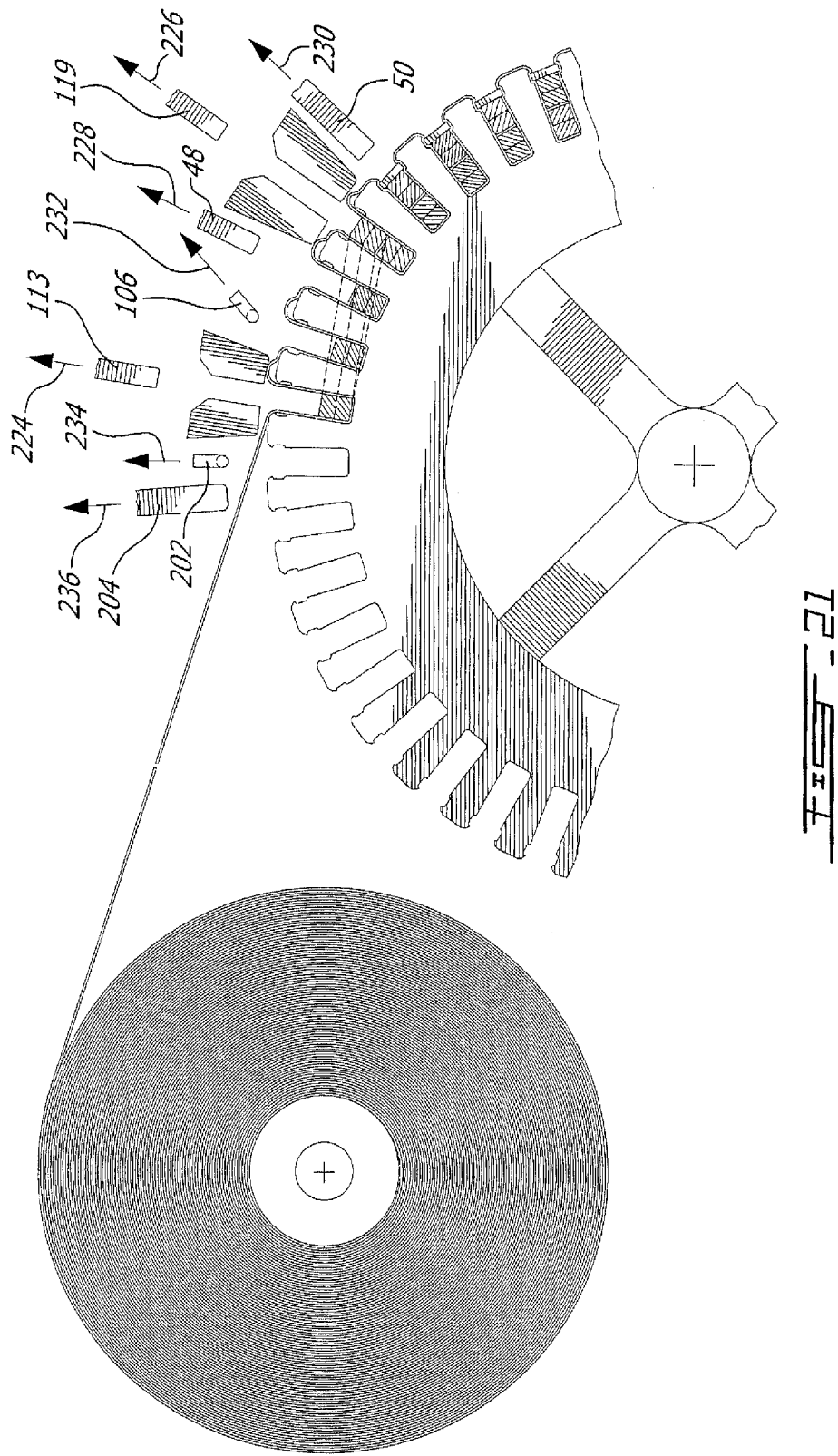
FIG. 21 is a schematic perspective view similar to FIG. 17, illustrating the removal of the various pushing elements and of the two paper management hooks.

FIG. 21 illustrate the removal of the various pushing elements 113, 119; of the holders 48, 50; of the paper management hooks 106, 202 and of the paper clamp 204 (see arrows 224-226, 228-230, 232-234 and 236, respectively).

FIG. 22 shows the rotation of the stator 38 of a predetermined angle (see arrow 238) so that the next slot 240 to receive the first leg of a prewound coil is aligned with the movement axis 122 of the paper management hook 106. Of course, rotation of the stator 38 causes some paper 32 to be unrolled from the roll 34 (see arrow 242).

In FIG. 23, the paper management hook 106 moves in the slot 240 (see arrow 244) so that the paper contacting portion 120 hooks with the paper 32. Similarly, the second paper management hook 202 moves so that its paper contacting portion 246 hooks the paper 32 (see arrow 248).

As illustrated in FIG. 24, a predetermined length of paper may be unrolled from the roll 34 (see arrow 250) by the pulling action of the paper management hooks 106 and 202 (see arrows 252 and 254) and provided on each side of the first prewound coil guide assembly 206.

Finally, FIG. 25 illustrates the reverse rotation of the stator 38 (see arrow 256) of a predetermined angle so as to position the slot 240 in alignment with the passageway 112 of the first prewound coil guide assembly 206.

The steps of FIGS. 17 to 25 can then be repeated until all the slots of the stator are filled, as described hereinabove.

It is to be noted that while the above description describes the continuous insertion of insulating paper in the slots of a stator of an electric machine, other adequate insulating material could replace the insulating paper.

As will be apparent from one skilled in the art, even though the steps in the insertion of the continuous paper in slots of a stator have been illustrated and described as being sequential, some of these steps could be done at the same time. Similarly, while some figures show simultaneous movements of many parts (see for example the movements of the holders 46, 48 and 50 in FIG. 4), these movements could be done sequentially.

It is to be noted that while the present disclosure describe the continuous paper coming from a continuous roll, the paper could be pre-cut to a predetermined length sufficient to cover the entire stator.

As will easily be understood by one skilled in the art, the size of the coils and the number of stator slots present between each longitudinal legs of the coils could be different from illustrated herein.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention.

What is claimed is:

1. A system to insert continuous insulating paper and a prewound coil provided with two longitudinal legs in longitudinal slots of a stator of an electric machine, comprising:
    a stator holder so configured as to hold the stator; and
    a prewound coil holder configured and sized to hold the two longitudinal legs of a prewound coil, the prewound coil holder being radially movable between a retracted position and an extended position where each longitudinal leg enters a corresponding longitudinal slot, the continuous insulating paper extending between the prewound coil holder and the stator;
    wherein movement of the prewound coil holder towards the extended position inserts both a portion of the continuous insulating paper and the longitudinal legs of the prewound coil in slots of the stator.

2. The insertion system recited in claim 1, wherein the stator holder is configured to rotatably hold the stator.

3. The insertion system as recited in claim 1, wherein the prewound coil holder includes two holding and pushing elements, each configured to hold a corresponding longitudinal leg of a prewound coil and to radially move between the retracted and extended positions.

4. The insertion system recited in claim 3, wherein the two holding and pushing elements hold the longitudinal legs of a prewound coil via vacuum suction.

5. The insertion system recited in claim 1, further comprising a radially movable interphase insulation paper holding element so configured as to radially insert an interphase insulation paper between a longitudinal leg of a first prewound coil and a longitudinal leg of a second prewound coil inserted in a particular longitudinal slot.

6. The insertion system recited in claim 1, further comprising a radially movable wedge holding element so configured as to radially insert a longitudinal wedge in a longitudinal slot.

7. The insertion system recited in claim 1, wherein the prewound coil holder includes first and second prewound coil guide assemblies each so configured as to guide one longitudinal leg of the prewound coil.

8. The insertion system recited in claim 7, wherein the prewound coil holder includes first and second radially mobile pushing elements respectively associated with the first and second prewound coil guide assemblies, the first and second radially mobile pushing elements being radially movable between the retracted and the extended positions.

9. The insertion system recited in claim 8, wherein each prewound coil guide assembly includes a first guide and a second guide that are radially mobile and that are so configured and positioned as to define a passageway therebetween, the passageway allowing a radially mobile pushing element therethrough.

10. The insertion system recited in claim 9, wherein the first guide of the first prewound coil guide assembly in so configured as to be radially mobile to removably hold the continuous paper against the stator.

11. The insertion system recited in claim 10, further comprising a paper management hook including a paper contacting portion so configured and sized as to releasably hook the continuous paper and to reciprocately move towards and away from the stator.

12. The insertion system recited in claim 9, further comprising a radially movable paper clamp selectively holding the continuous paper against the stator.

13. The insertion system recited in claim 11, further comprising a paper management hook including first and second paper contacting portions so configured and sized as to releasably hook the continuous paper and to reciprocately move towards and away from the stator.

14. A method to insert continuous insulating paper and a prewound coil provided with two longitudinal legs in the longitudinal slots of a stator of an electric machine, comprising:
    holding the stator;
    providing a prewound coil holder configured and sized to hold the two longitudinal legs of a prewound coil, the prewound coil holder being radially movable between a retracted position and an extended position where each longitudinal leg enters a corresponding longitudinal slot;
    positioning the prewound coil holder so that each longitudinal leg faces a corresponding longitudinal slot;
    positioning the continuous insulating paper between the prewound coil holder and the stator;
    moving the prewound coil holder from the retracted position towards the extended position to therefore insert both a portion of the continuous insulating paper and the longitudinal legs of the prewound coil in longitudinal slots of the stator.

15. The insertion method of claim 14, wherein the stator holding includes rotatably holding the stator.

* * * * *